United States Patent [19]

Doi et al.

[11] 4,206,440
[45] Jun. 3, 1980

[54] ENCODING FOR ERROR CORRECTION OF RECORDED DIGITAL SIGNALS

[75] Inventors: Toshitada Doi, Yokohama; Shinichi Kazami, Tokyo, both of Japan

[73] Assignee: Sony Corporation, Tokyo, Japan

[21] Appl. No.: 860,883

[22] Filed: Dec. 15, 1977

[30] Foreign Application Priority Data

Dec. 24, 1976 [JP] Japan .................................. 51-157235

[51] Int. Cl.² .......................... G06F 11/12; G11B 5/00
[52] U.S. Cl. ........................................ 371/39; 360/38
[58] Field of Search .............. 235/312; 340/146.1 AL, 340/146.1 BE; 360/38, 8; 358/8, 166, 167, 127

[56] References Cited

U.S. PATENT DOCUMENTS

| | | | |
|---|---|---|---|
| 3,465,287 | 9/1969 | Kennedy et al. | 340/146.1 BE |
| 3,798,597 | 3/1974 | Frambs et al. | 340/146.1 AL |
| 3,988,677 | 10/1976 | Fletcher et al. | 340/146.1 AL |
| 4,009,469 | 2/1977 | Boudreau et al. | 340/146.1 AL |
| 4,030,129 | 6/1977 | Whitlock | 360/8 |

OTHER PUBLICATIONS

J. L. Ramsey, Realization of Optimum Interleavers, IEEE Transactions on Information Theory, vol. It-16, No. 3, May 1970, pp. 338-345.

*Primary Examiner*—Charles E. Atkinson
*Attorney, Agent, or Firm*—Lewis H. Eslinger; Alvin Sinderbrand

[57] ABSTRACT

Digital signals consisting of sets of simultaneous bits have an error-correcting signal encoded into them by adding an error-correcting bit to each set. The sets thus enlarged are referred to as digital words. The digital signals are then converted from simultaneous, or parallel, form to serial, or sequential, form and the digital words from a block of several digital signals at a time are interleaved in such a way that corresponding words from each of the digital signals in the same block are placed in immediate sequence. Prior to adding the error-correcting bits error-detecting bits can be added to the original bits in intersecting sets can that intersect the first-mentioned sets in row by column relationship, and parity bits can also be formed simultaneously with the formation of the error-correcting bits as extensions of the intersecting sets. In decoding the resulting signals, changes in the bits forming one word of each digital signal can be directly corrected, and additional errors can be detected and minimized by forming mean value signals of digital signals that immediately precede and follow the erroneous digital signal or by retaining the preceding digital signal until the succeeding signals return to correct or correctable form.

22 Claims, 25 Drawing Figures

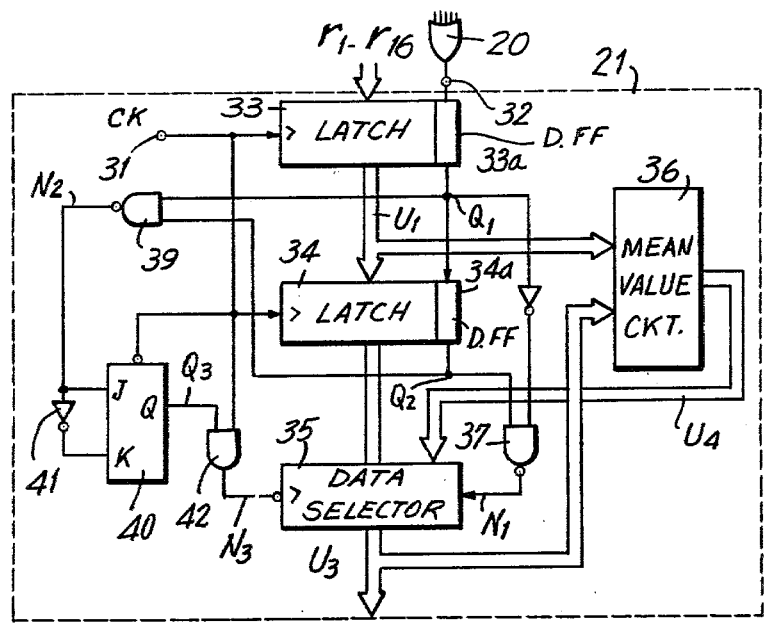
FIG.14
FIG.15
| $Q_1$ | $Q_2$ | $N_1$ | $Q_3$ |
|---|---|---|---|
| 0 | 0 | 1 | 1 |
| 0 | 1 | 0 | 1 |
| 1 | 0 | 1 | 1 |
| 1 | 1 | 0 | 0 |
FIG.16A  CK
FIG.16B  $Q_1$
FIG.16C  $Q_2$
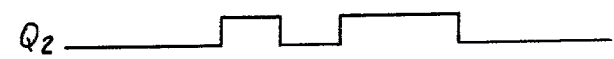
FIG.16D  $N_1$
FIG.16E  $Q_3$
FIG.16J  $N_3$
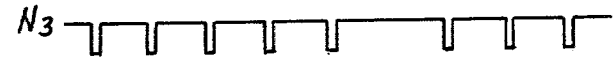

ENCODING FOR ERROR CORRECTION OF RECORDED DIGITAL SIGNALS

BACKGROUND OF THE INVENTION

1. Field of the Invention

This invention relates to the field of error code correction of recorded digital signals to correct for noise bursts and signal dropouts typical of signal recording and playback systems. In particular, the invention relates to the implementation of code correction techniques to singletrack recording formats such as are used in video tape recorders.

2. The Prior Art

Although this invention is useful in minimizing errors that are produced by various types of signal processing apparatus, it is particularly useful in minimizing errors in processing pulse code modulated (PCM) audio signals by a video tape recorder (VTR).

The frequency response of VTR amplifiers and transducers, even those intended for home use, is much better than is required for direct recording of audio signals, but VTRs are not directly suited for handling non-repetitive, analog signals, such as audio signals.

VTRs include rotary head means and synchronizing circuits for recording and playing back television signals, which are divided into fixed time segments by horizontal and vertical synchronizing signals. The necessity for providing synchronizing circuits and for including synchronizing signals with the signals being processed makes direct use of VTRs in recording audio signals difficult. Inserting synchronizing pulses on top of analog audio signals or substituting such pulses in place of audio signals would seriously deteriorate the signal quality. However, by using the audio signal to generate a PCM signal, the latter signal is at least in a form suitable for use in a VTR.

Such PCM signals are generated by sampling the audio signal at a fixed frequency, at least approximately twice as high as the highest audio frequency to be recorded. A multidigit binary pulse signal is generated, the binary numerical value, or code, of which is a function of the amplitude of the signal sample. This pulse signal is the aforementioned PCM signal, and although it is generated as a group of one or more pulses at times determined by the sampling signal, it is usually fed into some type of signal memorizing device. As soon as it is memorized, it ceases to be a signal and becomes a condition of some location in the memory. It can be read out more rapidly than it was read in or less rapidly or at the same speed, and in being read out, the condition, or information, will again become a signal.

U.S. patent application Ser. No. 766,746, filed Feb. 8, 1977, now U.S. Pat. No. 4,141,039, issued Feb. 20, 1979 and U.S. Pat. application Ser. No. 771,350, filed Feb. 23, 1977, now U.S. Pat. No. 4,138,694, issued Feb. 6, 1979, assigned to the assignee of the present application describe in detail VTRs used to record PCM signals based on audio signals. In effect, the pulse signals to be recorded on tape were read out of memory in batches spaced apart by enough time to allow the necessary synchronizing pulses to be inserted in the gaps between successive batches. This required that the pulses in each batch be read out more rapidly than they were read in. In playback, the operation was reversed, and the pulses were reproduced from the information stored on the tape and read into memory at the rate at which they were reproduced. They were then read out in such a way as to return to the original, uniform rate from which they could be reconverted into a high-quality analog audio signal.

In processing signals, even using a high-quality VTR and high-quality tape, there are unavoidable losses of signal information due, for example, to imperfections in the tape and to extraneous noise bursts. Various techniques have been devised in the computer industry to correct errors due to essentially the same causes in computer magnetic tape apparatus. One technique uses an optimal rectangular code (ORC): A. M. Patel and S. J. Hong, "Optimal Rectangular Code for High Density Magnetic Tapes," IBM J. Research Devel., 18 (1974) pp. 579-588. The article by Patel and Hong is described in simpler terms in: N. J. A. Sloane, "A Simple Description of an Error-Correcting Code for High-Density Magnetic Tape," The Bell System Technical Journal, 55 (1976) pp. 157-165. Still another relevant article on error correction, using an interleaving technique is: George C. Clark, Jr. and Robert C. Davis, "Two recent Applications of Error-Correction coding to Communications System design" IEEE Transactions on Communication Technology, Vol. Com-19, No. 5 (1971) pp. 856-863.

Information is recorded on magnetic tape in computer apparatus by encoding or generating the information in binary bit form and applying the bits through multiple heads onto parallel track areas of the magnetic tape. Typically, there are nine parallel tracks across the width of the tape, eight for data and one for recording error-checking parity bits. A succession of such groups of bits recorded in successive areas of the tracks is followed by a group of check bits to form a group codeword. The physical arrangement of tracks and recording areas is basically rectangular. In accordance with the ORC techniques, the check bits are generated in such a way that, together with the parity bits they make it possible to locate and correct errors in a track or, under certain conditions, in more than one track.

However, only one track at a time (except for possible overlapping ends) is recorded in a VTR. Hence the array of related bits is not rectangular but elongated and one bit wide. Each bit is recorded in seriatum, not in parallel with other bits on other tracks.

OBJECTS AND SUMMARY OF THE INVENTION

It is one of the objects of this invention to provide an error-checking system and method suitable for checking and correcting errors in serially recorded groups of binary signals.

Another object is to make use of ORC and cyclic redundancy check code techniques in serially recording binary signals and providing error-free playback thereof.

Another object of this invention is to provide an improved method and apparatus for correcting burst and dropout errors of signals recorded on a single track by means of an error-correcting code of a type previously used in multitrack tape apparatus.

A further object is to provide an improved method and system for converting an audio signal into a PCM signal, modifying the PCM signal into a video format, recording the modified PCM signal with error-correcting code signals in a VTR, and playing back and reconstituting the audio signal.

Other objects will be apparent from the following specification and associated drawings.

In accordance with this invention, a signal to be processed is converted into digital form, each time increment being converted into binary coded pulses, or bits, in parallel circuits. Cyclic redundancy check code (CRC) signals are generated by selective simultaneous comparison of the information bits, and the collection of simultaneously available CRC and information bit signals are encoded according to an ORC technique and the resultant signal is converted from parallel to serial format. Information signal and ORC code signal vectors are separated sequentially from their simultaneous relationship in a codeword and interleaved as a series of signals according to bit level order. A complete set of information bit, CRC, and ORC signals constitutes a sequential error-correctable block code signal. Groups of block code signals are then interleaved in related order and time-compressed to allow synchronizing signals at video line and field rates to be included at appropriate times in the time-compressed signals so that the synchronizing signals can properly control the VTR.

In playback, the signals are de-interleaved, converted to parallel relationship, and the CRC and ORC signals are analyzed in conjunction with the reproduced information signals to correct dropout and burst signals. If the signals are not entirely correctable, a mean-value signal based on signals before and after the uncorrectable signal is produced, and the corrected and mean-value signals are re-converted to analog form.

BRIEF DESCRIPTION OF THE DRAWINGS

FIG. 14 is a schematic diagram of an interpolation circuit for use in the system in FIG. 1.

FIG. 15 is a truth table associated with the circuit in FIG. 14.

FIGS. 16A–E and J shows a timing chart for the circuit in FIG. 14.

Figure 1:
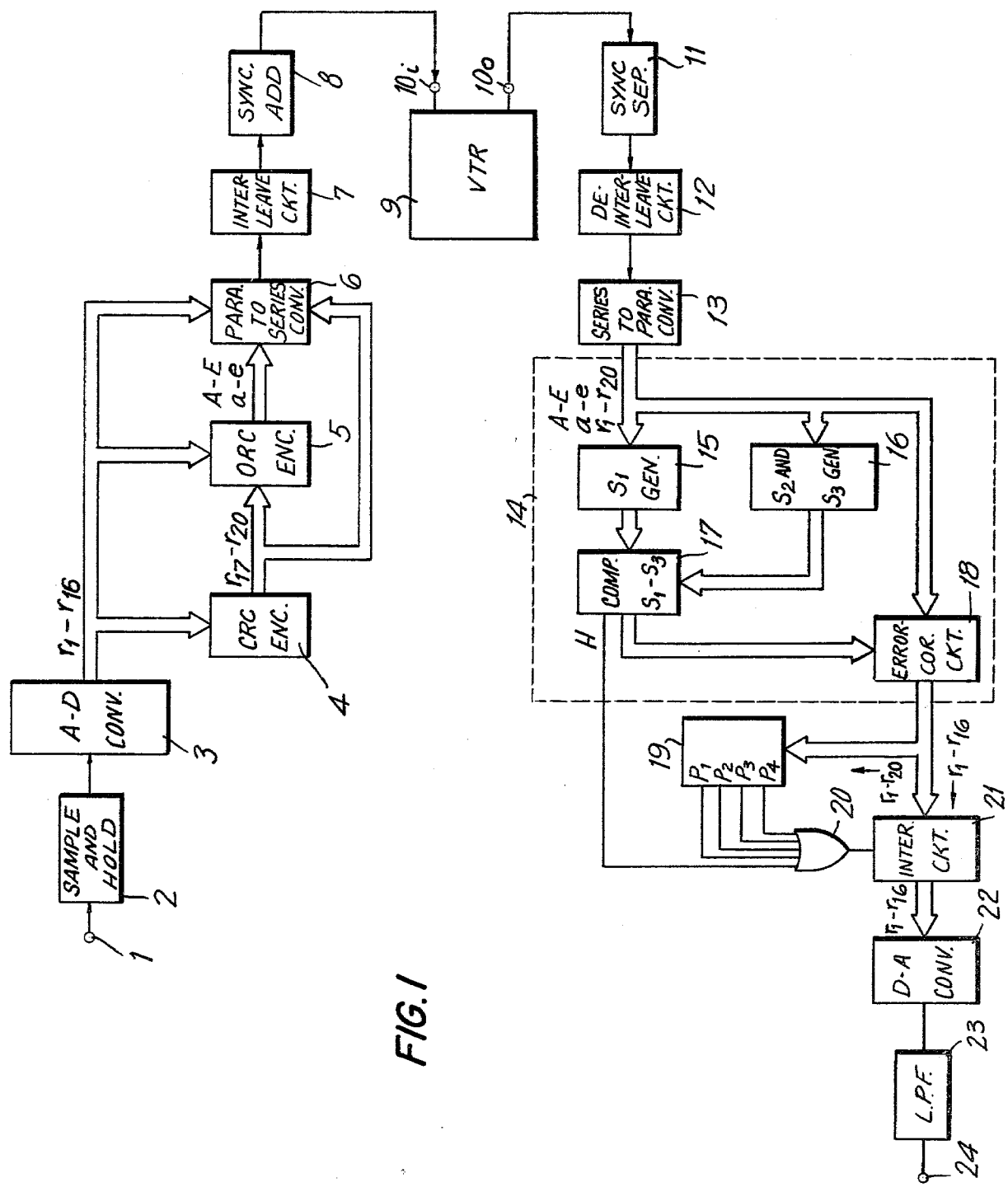
FIG. 1 is a block diagram of a system that includes both recording and playback sections incorporating the features of this invention.

One of the coding concepts to be used in the following disclosure is known as the cyclic redundancy check code (CRC). The mathematical aspects of the CRC will be described first in terms applicable to the embodiment that follows.

Cyclic Redundancy Check Code

The CRC code is generally expressed by a polynomial $F(x)$ with indeterminant x and coefficients from an n bit code $(a_{n-1}, a_{n-2}, -a_1, a_0)$ as follows, $$F(x) = a_{n-1}x^{n-1} + a_{n-2}x^{n-2} + \cdots + a_0$$

For example, if the 5 bit code (10011) is expressed by the polynomial $F(x)$, then $$F(x) = x^4 + x + 1$$

This polynomial is called the polynomial over Galois field of 2.

The encoding and decoding of the CRC code is essentially characterized by a division algorithm such that the code polynomial $F(x)$ is divided by the generator polynomial $G(x)$.

Now assuming that the code polynomial of degree $(k-1)$ for a k bit code is expressed as $M(x)$ and the generator polynomial of degree $(n-k)$ as $G(x)$, the division algorithm is as follows, $$M(x)x^{n-k} = G(x) Q(x) + R(x)$$

in which $Q(x)$ is the quotient polynomial and $R(x)$ is the remainder polynomial having a greatest degree of $(n-k-1)$. It should be noted that the encoded code polynomial $V(x)$ comprises the code polynomial $M(x) x^{n-k}$ and the remainder polynomial $R(k)$ added to the former polynomial. Therefore, the encoded polynomial $V(x)$ has degree $(n-1)$ and is given as follows:

$$\begin{aligned} V(x) &= M(x)x^{n-1} + R(x) \\ &= G(x)Q(x) \end{aligned}$$

This means that the encoded polynomial $V(x)$ is divisible by the generator polynomial $G(x)$.

Next, if a noise signal, which is expressed by a polynomial $E(x)$, is introduced into the code polynomial $V(x)$ during transfer, the code polynomial $V'(x)$ at the decoding side is expressed as follows;

$$V'(x) = V(x) + E(x)$$

If no error is introduced therein, $E(x) = 0$. Then, $V'(x) = V(x)$ and hence the polynomial $V'(x)$ is divisible by the polynomial $G(x)$.

However, if the polynomial $V'(x)$ is not divisible by the generator polynomial $G(x)$ in the decoder, causing a remainder polynomial $R'(x)$ to be generated, the polynomial $V'(x)$ is regarded as having an error bit. Then, the polynomial $V'(x)$ is given as follows:

$$V'(x) = G(x)Q'(x) + R'(x)$$

The polynomial $V(x)$ should be divisible by the generator polynomial $G(x)$, so that the remainder polynomial $R'(x)$ must be the remainder in the dividing algorithn of dividing the polynomial $E(x)$ by the generator $G(x)$. Accordingly, it is apparent that the remainder polynomial $R'(x)$ is a factor showing whether or not the code polynomial V'(x) contains the error bits. Such a remainder R'(x) is called a syndrome.

One example will be shown in the condition of n=7, k=4 and the generator polynomial $G(x)=x^3+x+1$, $M(x)=x^3+1=(1001)$ $M(x)x^3=x^6+x^3$ $M(x)x^3=G(x)Q(x)+R(x)$ $R(x)=x^2+x$     (1)

$V(x)=M(x)x^3+R(x)=x^6+x^3+x^2+x=(1001110)$     (2)

$E(x)=x^5=(0100000)$     (3)

$V'(x)=V(x)+E(x)=X^6+x^5+x^3+x^2+x=(1101110)$ $V'(x)=G(x)Q'(x)+R'(x)$     (4)

$R'(x)=x^2+x+1=(111)$     (5)

The basic circuit of the CRC code encoder and decoder comprises a dividing circuit with the divisor G(x) which generates the remainder, not the quotient. The dividing circuit is essentially formed by a shift register, each stage of which is preceded by a modulo 2 adder that adds, on a modulo 2 basis (which means counting to the base 2 without carry), the output of the preceding stage and output of the shift register according to whether the appropriate element of the polynomial is $g_i=1$ or $g_i=0$ in the divisor $G(x)=g_n x^n+g_{b-1}x^{n-1}+g_{n-2}x^{n-2}+\cdots+g_2 x^2+g_1 x+g_0$.

Now, the generator polynomial G(x) in the above example is given as follows:

$G(x)=x^3+x+1$

Accordingly, the dividing circuit of the polynomial G(x) includes a three-stage shift register with feedback loops from the output to modulo 2 adders at the input and between the first and second stages. The clocking conditions in each shift register stage and the calculation example are shown;

$E(x) = 0$     (i)
$V(x) = x^6 + x^3 + x^2 + x$ $$x^3 + x + 1 \overline{\smash{)}\begin{array}{l} x^6 \phantom{+ x^5} + x^3 + x^2 + x \\ \underline{x^6 + x^4 + x^3} \\ \phantom{x^6} x^4 \phantom{+ x^3} + x^2 + x \\ \underline{\phantom{x^6} x^4 \phantom{+ x^3} + x^2 + x} \\ \phantom{x^6 + x^4 + x^3 + x^2 + x} 0 \end{array}} \quad \begin{array}{l} x^3 + x \end{array}$$

TABLE I

| clock | input | Conditions in shift registers | | |
|---|---|---|---|---|
| | | $D_0$ | $D_1$ | $D_2$ |
| (initial condition) | | 0 | 0 | 0 |
| $t_1$ | 1 | 1 | 0 | 0 |
| $t_2$ | 0 | 0 | 1 | 0 |
| $t_3$ | 0 | 0 | 0 | 1 |
| $t_4$ | 1 | 0 | 1 | 0 |
| $t_5$ | 1 | 1 | 0 | 1 |
| $t_6$ | 1 | 0 | 0 | 0 |
| $t_7$ | 0 | 0 | 0 | 0 ← The remainder |

$E(x) = x^5$     (ii)
$V'(x) = x^6 + x^5 + x^3 + x^2 + x$ $$x^3 + x + 1 \overline{\smash{)}\begin{array}{l} x^6 + x^5 \phantom{+ x^4} + x^3 + x^2 + x \\ \underline{x^6 \phantom{+ x^5} + x^4 + x^3} \\ \phantom{x^6} x^5 + x^4 \phantom{+ x^3} + x^2 + x \\ \underline{\phantom{x^6} x^5 \phantom{+ x^4} + x^3 + x^2} \\ \phantom{x^6 +} x^4 + x^3 \phantom{+ x^2} + x \\ \underline{\phantom{x^6 +} x^4 \phantom{+ x^3} + x^2 + x} \\ \phantom{x^6 + x^4} x^3 + x^2 \\ \underline{\phantom{x^6 + x^4} x^3 \phantom{+ x^2} + x + 1} \\ \phantom{x^6 + x^4 + x^3} x^2 + x + 1 \end{array}} \quad \begin{array}{l} x^3 + x^2 + x + 1 \end{array}$$

the remainder

TABLE 2

| Clock | input | Conditions in shift registers | | |
|---|---|---|---|---|
| | | $D_0$ | $D_1$ | $D_2$ |
| (initial condition) | | 0 | 0 | 0 |
| $t_1$ | 1 | 1 | 0 | 0 |
| $t_2$ | 1 | 1 | 0 | 0 |
| $t_3$ | 0 | 0 | 1 | 1 |
| $t_4$ | 1 | 0 | 1 | 1 |
| $t_5$ | 1 | 0 | 1 | 1 |
| $t_6$ | 1 | 0 | 1 | 1 |
| $t_7$ | 0 | 1 | 1 | 1 ← The remainder |

Accordingly, the contents of the shift registers show whether or not the transferred code contains error bits.

Figure 2:
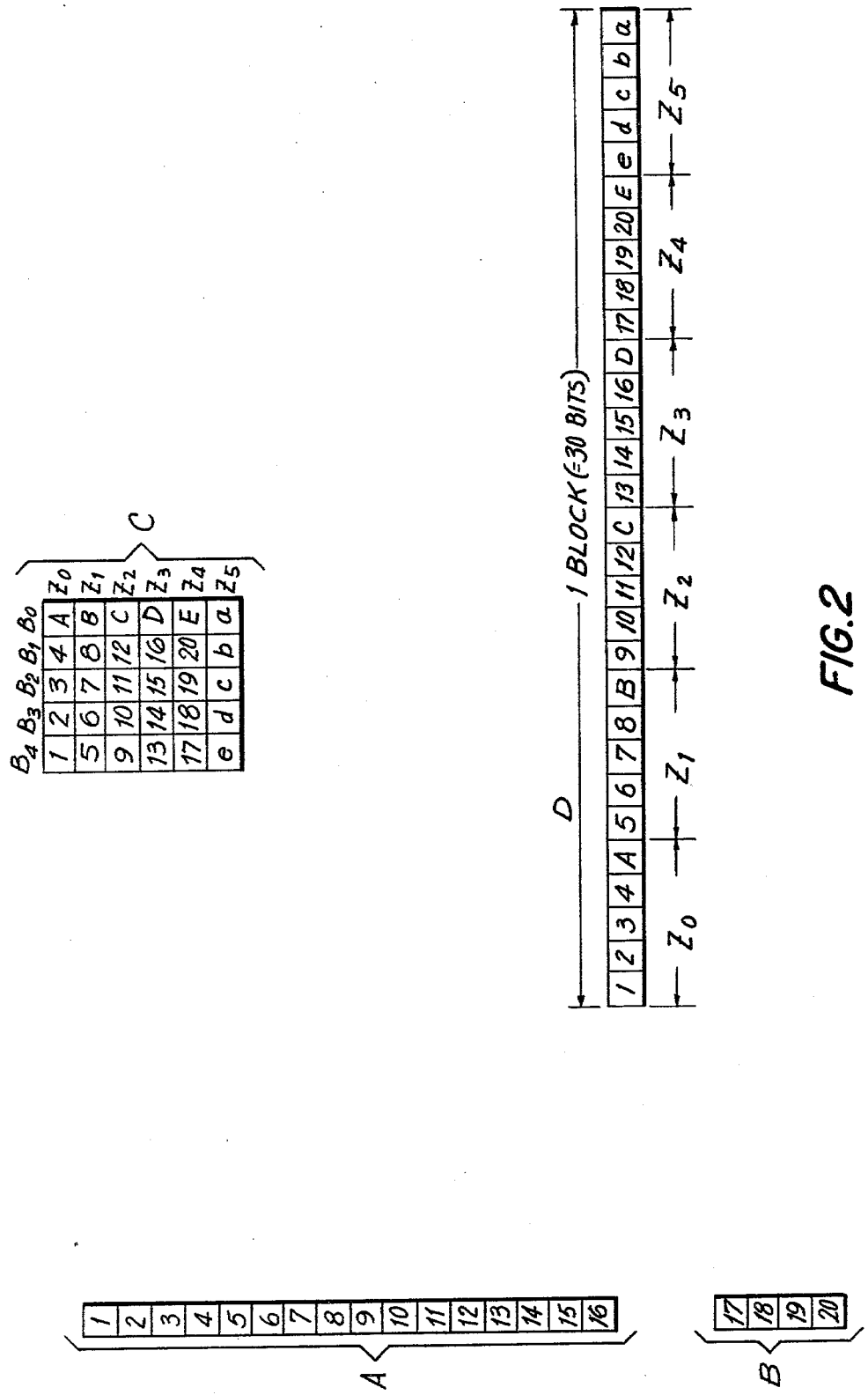
FIGS. 2A–2D symbolically represent information, CRC, and ORC signal code bits at different locations in the system in FIG. 1.

Without going into detail at this point in the description of the invention, the circuit in FIG. 1 includes an input terminal 1 to which an audio signal is applied and a sample-and-hold circuit 2 connected to receive the audio signal from the input terminal 1. The sampled output from the sample-and-hold circuit 2 is converted by an analog-to-digital (A-D) converter 3 into an information bit signal of, for example, 16 bits, $r_1$ to $r_{16}$, in parallel as illustrated symbolically in FIG. 2, in which the symbols are omitted and only their suffix numerals are shown. The information bit signal from this A-D converter 3 is fed to a cyclic redundancy check (CRC) encoder 4, an ORC encoder 5 and a parallel-series converter 6, respectively.

The output of the parallel-series converter 6 is applied to an interleave circuit 7. The interleave circuit 7, which funtions to rearrange the array of the serial code from the parallel-series converter 6 and to compress the time base of this serial code to create a data-lacking period, can be formed by random access memories (RAMs). This data-lacking period is deliberately made approximately equal to the length of the vertical blanking period of a standard video signal. The output of the interleave circuit 7 is applied to a synchronizing signal adding circuit 8 where synchronizing signals similar to the horizontal and vertical synchronizing signals and equalizing pulses in a video signal are added in an interleaving sense to the time-compressed information bit signals.

The PCM signal thus modified to have the same type of time format as a video signal is applied to a recording signal input terminal $10_i$ of a VTR 9 of the two-rotating-head type. The purpose of modifying the PCM signal in this way is that the recording and reproducing of PCM signals are thereby made possible utilizing a standard VTR, which normally has the functions of recording and reproducing video signals and hence the fundamental capability of recording and reproducing a high-quality audio signal.

In the VTR 9, the PCM signal is passed through a recording system and recorded on a magnetic tape (not shown) by a pair of rotating magnetic heads (not shown) to form oblique tracks the length of each of which corresponds to one field of a video signal.

The interleave circuit 7, which is provided to rearrange the serial code, operates to complete the rearrangement within the maximum limit of a single field period. In this embodiment, the arrangement of signals is completed once in a period of 35H (H represents one horizontal period). According to television standards, one field is composed of 262.5H; the period during each field in which data can be inserted is about 245H. The remaining 17.5H is the vertical blanking period. The rearrangement of the serial code can therefore be repeated seven times in the available 245H period of each field. The length of each block code is selected to be an integral submultiple of H, for example, 1/6H, and, for example, after every two-block interval, a synchronizing signal, which serves as a time base for the data processing, and which corresponds to a horizontal synchronizing signal, is inserted between bits of the information signal in spaces provided by the time compression.

Upon reproduction of the recorded signal by means of the VTR 9 a PCM signal that is the same as the recorded signal is available at a signal output terminal $10_o$ to be applied through a synchronizing signal separator circuit 11 to a de-interleave circuit 12. The synchronizing signal separated out by means of the circuit 11 is used as a reference to form a clock pulse for the de-interleave circuit 12 and other circuits of the reproducing system. In the de-interleave circuit 12, the PCM signal pulses are rearranged to be in the original order and the time base is re-expanded to its original value so that a continuous PCM signal can be obtained and the data-lacking period can be eliminated by the time reexpansion. This de-interleave circuit 12 can include RAM means as in the interleave circuit 7.

If the clock pulse recreated from the synchronizing signal and having a time base variation component, or jitter, in VTR 9 as separated from the reproduced signals is employed together with a clock pulse of a constant repetition frequency generated from the oscillator to form the clock pulse actually used in the above process, the PCM signal can be prevented from being affected by the time base variation, such as the jitter or the like, in the VTR 9. The PCM signal thus reproduced is converted to a parallel code by a series-parallel converter 13 and subsequently applied to a ORC decoder 14, which includes the components surrounded by a broken line in FIG. 1.

The ORC decoder 14, which will be described in detail later, includes error detection circuits 15 and 16, a coincidence detecting circuit 17, and an error-correcting circuit 18. The error-correcting circuit is supplied with information bit signals from the series-parallel converter 13 and output signals from the circuit 18, with errors corrected, are applied to a CRC decoder 19. The CRC decoder 19 supplies an output signal having four bits $P_1$ to $P_4$ to an OR gate 20, to which is also fed a discord-detected output signal from coincidence circuit 17 when error correction by the ORC is impossible. The output of the OR gate 20 controls an interpolation circuit 21. In addition, this interpolation circuit 21 is supplied with the information bits in parallel from the error-correcting circuit 18, and the output of the circuit 21 is applied to a digital-to-analog (D-A) converter 22, the output of which is delivered through a low-pass filter 23 to an output terminal 24.

Figure 3:
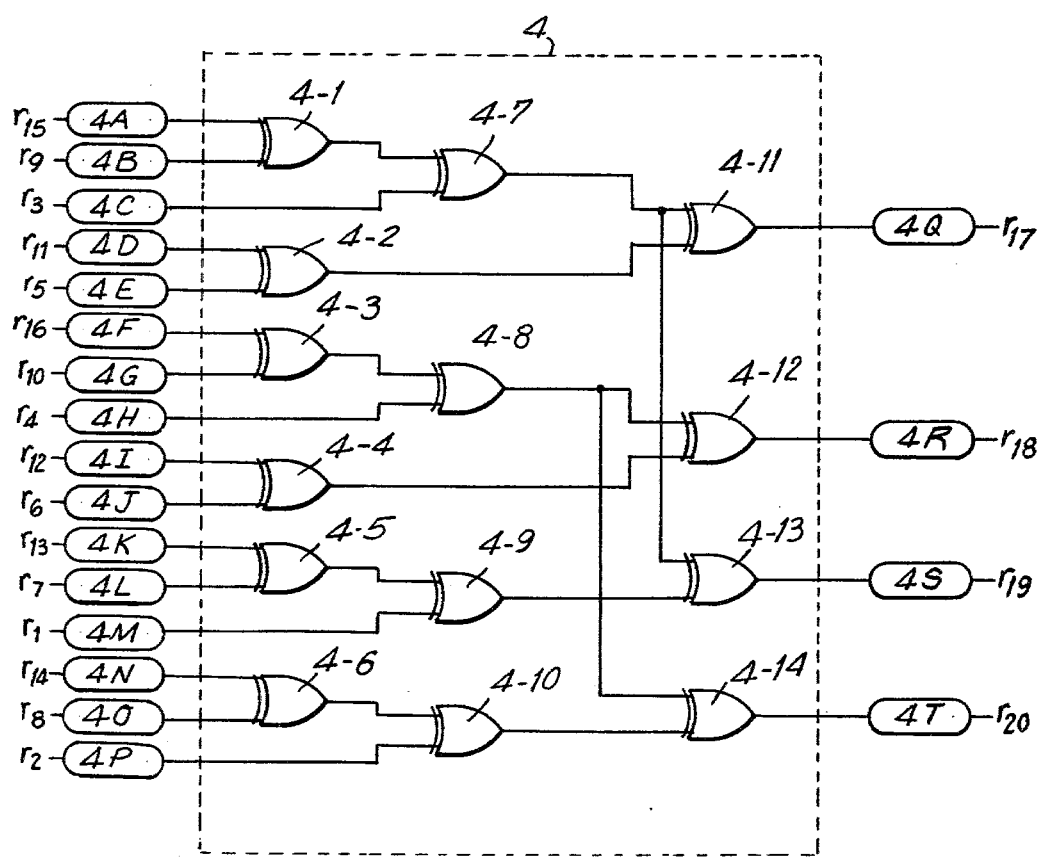
FIG. 3 is a schematic diagram of a CRC encoder for use in the system in FIG. 1.

The CRC encoder 4 shown in more detail in FIG. 3 functions to form a CRC code composed of four bits, $r_{17}$, $r_{18}$, $r_{19}$ and $r_{20}$ based on information bits $r_1$–$r_{16}$. The encoder includes 16 input terminals 4A–4P to which the signals $r_1$–$r_{16}$ of FIG. 2A are connected in parallel, as labeled, from the A-D converter 3 in FIG. 1 and four output terminals 4Q–4T from which signals $r_{17}$–$r_{20}$, respectively, of FIG. 2B are obtained. Between the input terminals and the output terminals are three levels of exclusive-OR gates 4-1 through 4-14 that combine the bit signals $r_1$–$r_{16}$ on a modulo 2 basis to generate the output signal bits $r_{17}$–$r_{20}$ according to the CRC code.

The meaning of the CRC as applied to this invention will now be described. Encoding is performed so that a polynomial code having the information bits as its coefficient is divided by a generating polynomial, and the resulting remainder is added as a CRC code to the information bit signal. Upon decoding the processed signal, a received code including the CRC code is divided by the same generating polynomial. If the remainder is zero, it indicates that no error is present, but if there is a remainder, there is an error, which can be detected. In this specification, the operation is on the basis of modulo 2, i.e.

| (addition table) | (multiplication table) |
|---|---|
| 0 + 0 = 0 | 0 · 0 = 0 |
| 1 + 0 = 1 | 1 · 0 = 0 |
| 0 + 1 = 1 | 0 · 1 = 0 |
| 1 + 1 = 0 | 1 · 1 = 1 |

Modulo 2 multiplication corresponds to the operation of a binary AND gate. Modulo 2 addition corresponds to the operation of an exclusive-OR gate, since there is no carry, and only the residue remains. In modulo 2 addition $r_n + r_n = 0$ because either $r_n = 0$, in which case it is obvious that $0+0=0$, or $r_n = 1$, in which case $1+1=0$, as defined in the addition table. The CRC encoder 4 can be formed by a shift register and a modulo 2 adder. Since this example employs a parallel processing, the following operation can be carried out by an adder when a generating polynomial G(x) is taken as, for example, $x^4 + x^2 + 1$. That is, $$\left. \begin{array}{l} r_{17} = r_3 + r_5 + r_9 + r_{11} + r_{15} \\ r_{18} = r_4 + r_6 + r_{10} + r_{12} + r_{16} \\ r_{19} = r_1 + r_3 + r_7 + r_9 + r_{13} + r_{15} \\ r_{20} = r_2 + r_4 + r_8 + r_{10} + r_{14} + r_{16} \end{array} \right\} \quad (1)$$

Thus, the CRC code $r_{17}$ to $r_{20}$ can be obtained. To take an arbitrary example, if the sampled amplitude is converted into information bits $r_1$ through $r_{16}$ having the values 1,0,1, 1, 0, 1, 0, 0, 1, 0, 0, 0, 1, 1, 0, 1, the values of $r_{17}$ through $r_{20}$ will be 0, 1, 0, 0, respectively.

Figure 4:
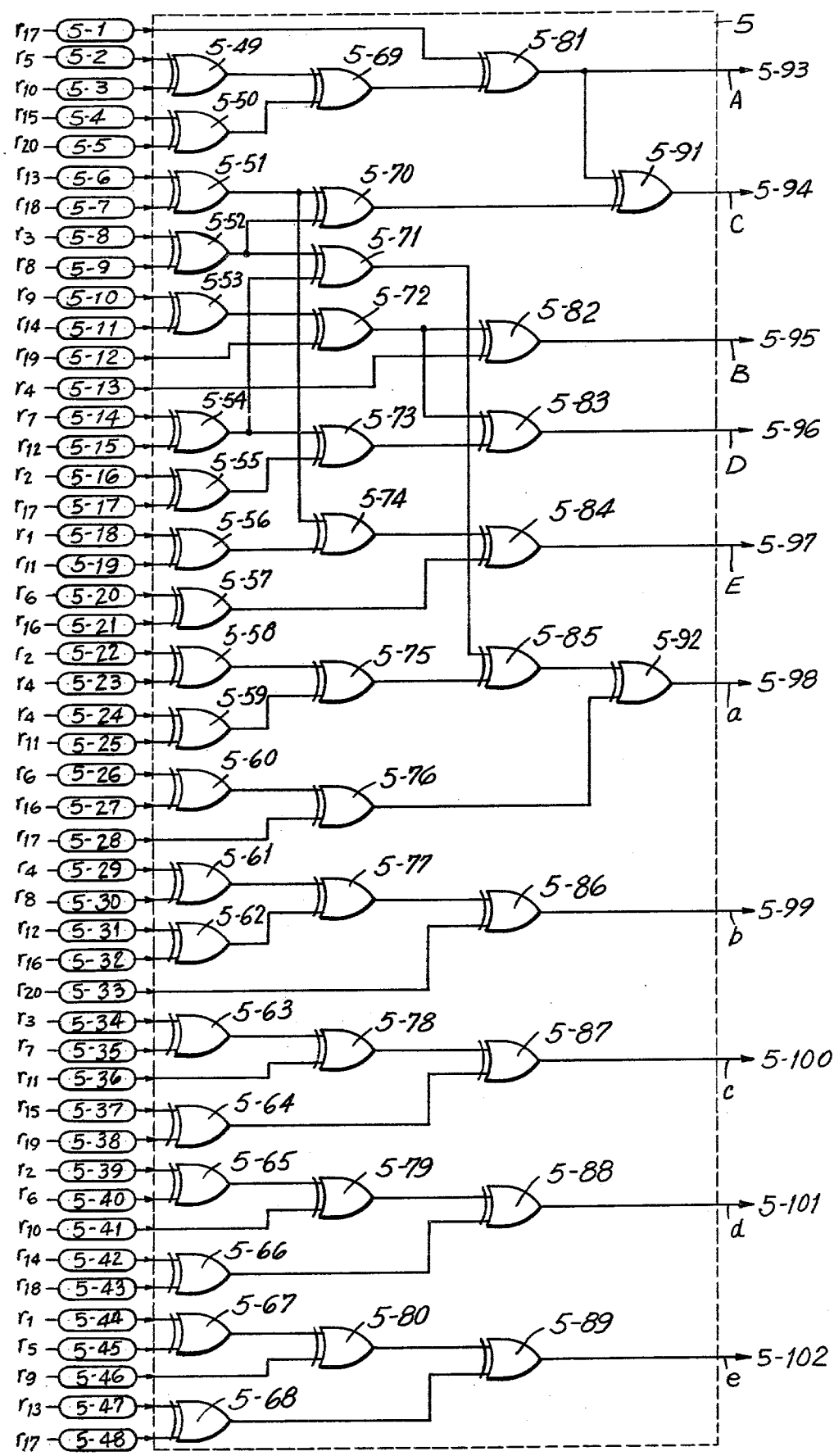
FIG. 4 is a schematic diagram of an ORC encoder for use in the system in FIG. 1.

The ORC encoder 5, shown in detail in FIG. 4, serves to form one-block ORC signal, or codeword, of the 6×5 matrix type as illustrated in FIG. 2C from the total of 20 bits of information bits $r_1$ to $r_{16}$ and CRC code $r_{17}$ to $r_{20}$. The ORC encoder 5 has input terminals 5-1 through 5-48 to which the information bits $r_1$ through $r_{16}$ and the CRC bits $r_{17}$ through $r_{20}$ are supplied as labeled. It will be noted that the same bits are supplied to more than one terminal; for example, the CRC bit signal $r_{17}$ is applied to terminals 5-1, 5-17, 5-28, and 5-48, and the information bit signal $r_6$ is applied to terminals 5-20, 5-26, and 5-40. The terminals that receive the same signal could be connected directly to each other internally with only a single lead brought out to receive a signal. This would reduce the total number of input terminals from forty-eight to twenty.

The input terminals 5-1 through 5-48 are connected to exclusive-OR gates arranged in four tiers within the encoder 5. The first tier includes exclusive-OR gates 5-49 through 5-68, the second tier includes gates 5-69 through 5-80, the third, tier gates 5-81 through 5-90, and the fourth tier, gates 5-91 and 5-93. The circuit has ten output terminals 5-93 through 5-102.

Input terminals 5-29 through 5-48 are arranged in four groups connected to four similar sets of exclusive-OR gates, each set including four exclusive-OR gates connected in the same way. For example, the bit signals $r_4$, $r_8$, $r_{12}$, $r_{16}$, and $r_{20}$ of the column vector $B_1$ in FIG. 2C are applied to the input terminals 5-29 through 5-33, respectively. The terminals 5-29 and 5-30 are the input terminals for the exclusive-OR gate 5-61 and the terminals 5-31 and 5-32 are the input terminals for the exclusive-OR gate 5-62. The outputs of the gates 5-61 and 5-62 are connected to the two input terminals of the exclusive-OR gate 5-77, the output of which is connected to one input terminal of the exclusive-OR gate 5-86, the other input terminal of which is directly connected to the input terminal 5-33.

The sub-circuit just defined adds, on a modulo 2 basis, the "0" or "1" signals $r_4$, $r_8$, $r_{12}$, $r_{16}$, and $r_{20}$ and produces at the output terminal 5-99 the output bit signal b that is the parity checking bit of the vector $B_1$ in FIG. 2C. If the number of "1" signals applied to the group of terminals 5-29 through 5-33 is even, b=0, but if the number is odd, b=1.

The ORC encoder 5 produces the parity bits c through e at the terminals 5-100 through 5-102, respectively, in the same way that the bit signal b is produced at the terminal 5-99. In addition, the ORC encoder 5 produces ORC signals A through E by modulo 2 addition of the bit signals $r_1$ through $r_{20}$ and produces the parity check bit a to correspond to the number of "1" signals in the signals A through E.

In the past, the ORC signals have been recorded so that there are six rows $Z_0$ to $Z_5$ formed in parallel tracks on magnetic tape by six stationary transducers. Here, the following expressions are given for the column vectors $B_0$ to $B_4$:

$$\left.\begin{array}{l} B_0 = (A, B, C, D, E)' \\ B_1 = (r_4, r_8, r_{12}, r_{16}, r_{20})' \\ B_2 = (r_3, r_7, r_{11}, r_{15}, r_{19})' \\ B_3 = (r_2, r_6, r_{10}, r_{14}, r_{18})' \\ B_4 = (r_1, r_5, r_9, r_{13}, r_{17})' \end{array}\right\} \quad (2)$$

where the primes mean the transported matrix.

The column vectors $B_1$ to $B_4$ are composed of information bits, whereas the column vector $B_0$ is defined as follows:

$$B_0 = TB_1 + T^2B_2 + T^3B_3 + T^4B_4 \quad (3)$$

where T is defined by the following matrix, $$T = \begin{pmatrix} 0 & 0 & 0 & 0 & 1 \\ 1 & 0 & 0 & 0 & 0 \\ 0 & 1 & 0 & 0 & 1 \\ 0 & 0 & 1 & 0 & 0 \\ 0 & 0 & 0 & 1 & 0 \end{pmatrix} \quad (4)$$

With $T^2$, $T^3$ and $T^4$ being previously determined, the respective bits of the column vector $B_0$ can be obtained by the parallel processing of the following expressions in the circuit of FIG. 4:

$$\left.\begin{array}{l} A = r_5 + r_{10} + r_{15} + r_{17} + r_{20} \\ B = r_4 + r_9 + r_{14} + r_{19} \\ C = r_3 + r_5 + r_8 + r_{10} + r_{13} + r_{15} + r_{17} + r_{18} + r_{20} \\ D = r_2 + r_7 + r_9 + r_{12} + r_{14} + r_{17} + r_{19} \\ E = r_1 + r_6 + r_{11} + r_{13} + r_{16} + r_{18} \end{array}\right\} \quad (5)$$

The five bits (a to e) of the sixth row $Z_5$ are even parity bits for column vectors $B_0$ to $B_4$.

$$\left.\begin{array}{l} a = A + B + C + D + E \\ b = r_4 + r_8 + r_{12} + r_{16} + r_{20} \\ c = r_3 + r_7 + r_{11} + r_{15} + r_{19} \\ d = r_2 + r_6 + r_{10} + r_{14} + r_{18} \\ e = r_1 + r_5 + r_9 + r_{13} + r_{17} \end{array}\right\} \quad (6)$$

The parallel-series converter 6 is supplied simultaneously with all of the information bits ($r_1$ to $r_{16}$) from A-D converter 3, the CRC code ($r_{17}$ to $r_{20}$) from CRC encoder 4 and the ten bits (A to E) and (a to e) from the CRC encoder 5, thereby producing simultaneously a 30-bit series code (hereinafter referred to as one block) in the order of $Z_0$, $Z_1$, $Z_2$ ... $Z_5$ as illustrated in FIG. 2C.

The 30-bit block is converted by the parallel-to-series converter 6 from parallel form into the serial form shown in FIG. 2D, one row at a time. Each row consists of information bits of adjacent order and the ORC code bit associated with that order. Thus, the four least significant bits are in one row of the array in FIG. 2C, the next four in the next row, and so on to the final row that has the four most signigicant bits.

Figure 5:
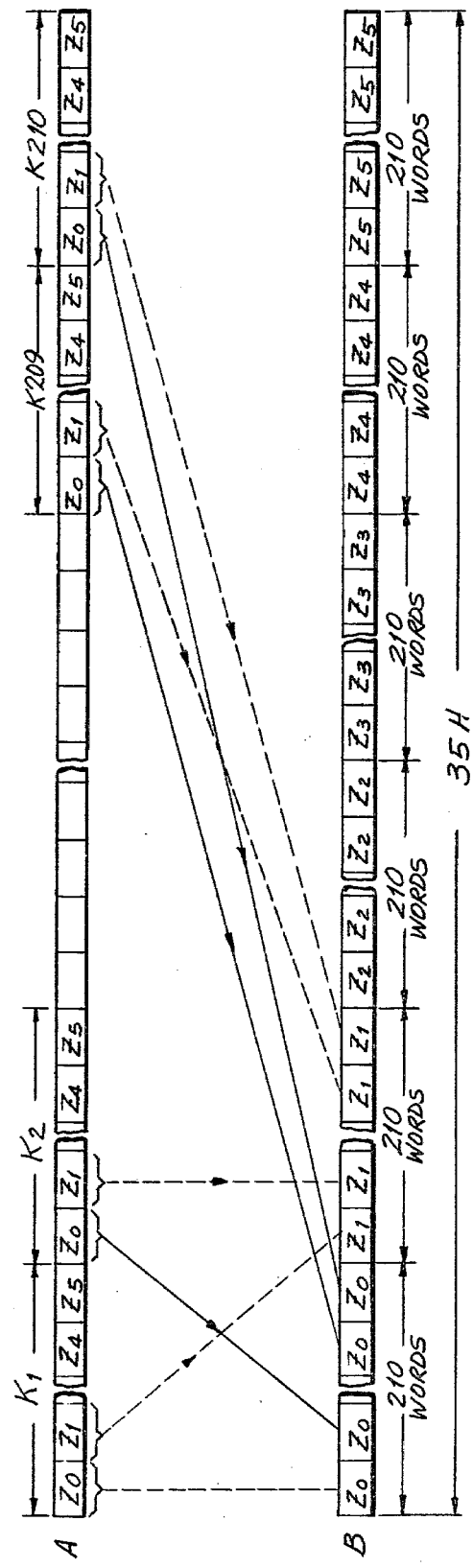
FIGS. 5A and 5B show processed signal relationships associated with the operation of the interleave circuit in FIG. 1.
Figure 6:
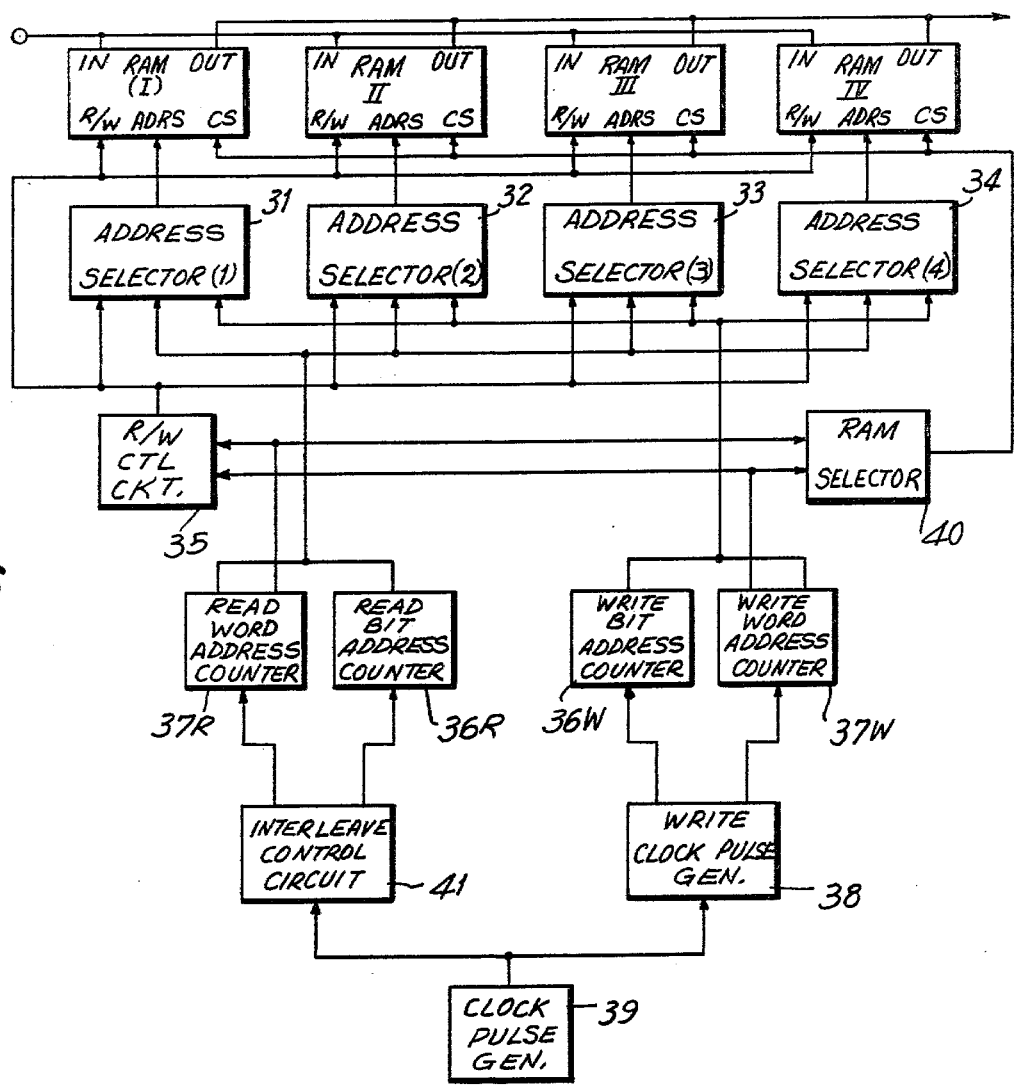
FIG. 6 is a schematic diagram of an interleave and de-interleave circuit for use in the system in FIG. 1.
Figure 7:
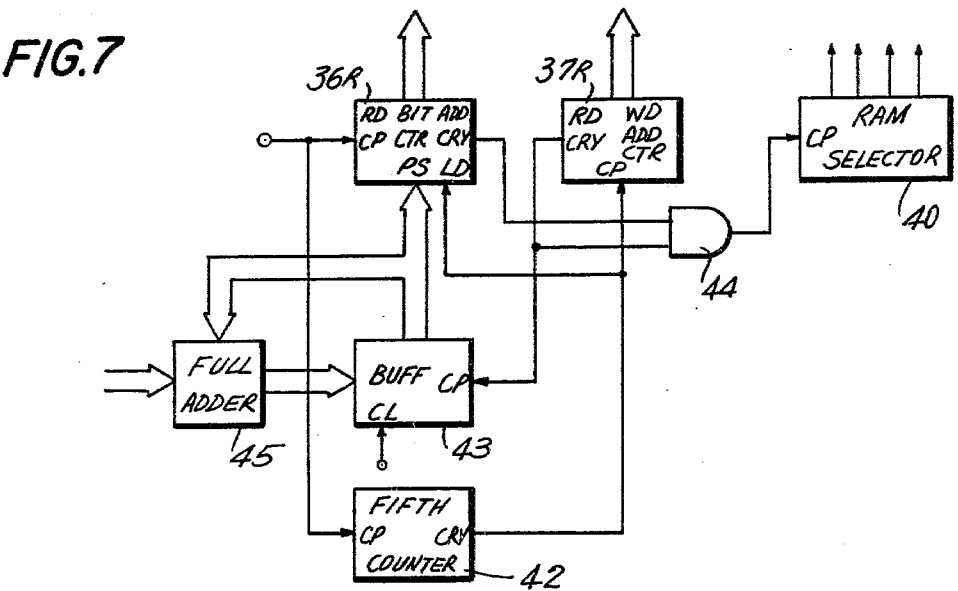
FIG. 7 is a control circuit associated with the interleave and de-interleave circuit in FIG. 6.
Figure 8:
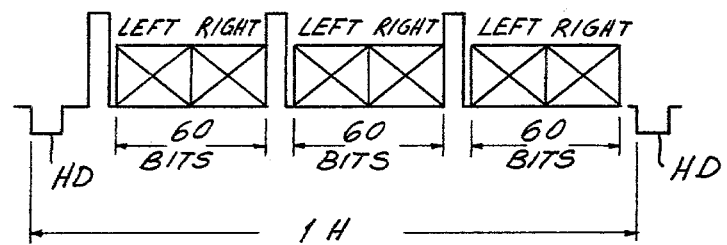
FIG. 8 shows the waveform of one horizontal line interval of a time-compressed PCM audio signal.

The interleaving circuit 7, one embodiment of which is shown in FIGS. 6 and 7, and which accomplishes an essential aspect of this invention, will now be described in conjunction with FIGS. 5, 8, and 9.

FIG. 5A shows the serial code of 35H length with the rows $Z_0$ to $Z_5$ supplied as a unit from the parallel-series convertor 6. This code is composed of 210 blocks $K_1$, $K_2$ ... $K_{210}$ in the period of 35H, and hence there exists a code of 1260 rows containing a total of 6300 bits. In the interleave circuit 7, the first rows $Z_0$ of five bits are extracted from each of the respective blocks $K_1$ to $K_{210}$ and arranged in the block order as indicated by solid lines in FIG. 2B. Next, the second rows $Z_1$ are selected from each of the respective blocks $K_1$ to $K_{210}$ and arranged in the block order as shown by broken lines in FIG. 5B. Similarly, the following third to sixth rows $Z_2$ to $Z_5$ are respectively chosen from each of the blocks $K_1$ to $K_{210}$ and arranged in the block order. Therefore, the output of the interleave circuit 7, as illustrated in FIG. 5B, the includes six groups of tracks $Z_0$ to $Z_5$ in order each group consisting of 210 tracks extracted from each of the blocks $K_1$ to $K_{210}$. This grouping places bits of like order from 210 successive samplings in the sample-and-hold circuit 2 in FIG. 1 so that they are adjacent in time and will be recorded in adjacent track increments on the tape in the VTR 9.

Since the interleaving is completed within a period of 35H as described previously, a memory capacity $C_M$ required for the interleaving is given by $$C_M = 3 \times 60 \times 35 = 6300 \text{ bits} = 6.3 \text{ K bits}$$

For reducing the time base of a PCM signal, in addition to effecting interleaving thereof, it is necessary to provide a memory capacity of at least 3 $C_M$. Further, in order to eliminate time base variations due to the jitter, drift or the like upon reproduction, it is desirable to select a memory campacity of 4 $C_M$. That is, four RAMs I, II, III and IV each having a capacity of $C_M$, as illustrated in FIG. 6, are employed. The four RAMs are controlled so that when any one of them is carrying out a write operation, another RAM can carry out a read operation. In addition, by making the frequency of a read clock pulse higher than that of a write clock pulse, a predetermined data-lacking period is formed, and by controlling the addresses in which information is written, or stored, and from which it is read, or retrieved, the interleaving is carried out.

FIG. 6 shows one example of the memory device 7. Each of the RAMs I to IV is a static RAM of 8 K bits and has a data input terminal, a data output terminal, a terminal R/W to which write and read control signals are applied, a terminal ADRS to which an address signal is applied, and a terminal CS to which is applied a RAM selecting signal for selecting one of RAMs I to IV. Address selectors 31 through 34 are provided for the RAMs I to IV, respectively. Either of the write-address or the read-address signals of 13 bits in parallel is selected in the address selectors by a write-control and read-control signal from a write-control and read-control circuit 35, and delivered to the terminal ADRS of the respective RAMs. The write-address signal is the combination of a bit address signal of 5 bits in parallel (since one word is composed of 30 bits and a 5-bit signal is the minimum required to provide at least 30 addresses) and a word-address signal of 8 bits in parallel (since the interleaving is completed through 210 words $K_1$ to $K_{210}$ which require at least 8 bits).

A write-bit address counter 36W is provided for generating the bit-address signal, and a write-word address counter 37W is provided for generating the word-address signal. A write clock pulse generator 38 forms a word clock pulse and a bit clock pulse having a period of (1/30) of the former repetition period by the application of the clock pulse from a clock generator 39. The bit clock pulse is applied to the write bit address counter 36W, and the word clock pulse to the write word address counter 37W. That is, the write bit address counter 36W to be supplied with the bit clock pulse progresses one step every 30 counts, while the write word address counter 37W to be supplied with the word clock pulse having a frequency of (1/30) that of the bit clock pulse is adapted to progress one step every 210 counts. A carry from the write word address counter 37W is fed to a RAM selector 40, which then delivers a RAM-selecting signal to the terminal CS of the respective RAMs. Therefore, when the PCM signal of 210 words (each word being composed of 30 bits) is written in RAM I, for example, the write address couner 37W produces a carry, by which the next PCM signal is written in RAM II. At the same time, the carry from the write word address counter 37W is fed to the read control circuit 35, which delivers the write-control and read-control signal to the terminal R/W of the respective RAMs so as to specify the write cycle of the RAMs.

Like the write address signal, the read address signal consists of 13 bits in parallel that result from the combination of the bit address signal of 5 bits in parallel supplied from the read bit address counter 36R and the word address signal of 8 bits in parallel supplied from the read word address counter 37R. This address signal of 13 bits is applied to the address selectors 31 to 34. In order to reduce the time base during reading, the period of the read bit clock pulse is selected to be somewhat shorter than that of the write bit clock pulse, and to produce interleaving, the read bit address counter 36R and the read word address counter 37R are controlled by an interleaving control circuit 41.

FIG. 7 shows the read bit address counter 36R of 30-count progress that is supplied with the bit clock pulse. The bit clock pulse is also applied to a quinary counter 42, and the carry of this counter is fed to a clock input terminal CP of the read word address counter 37R and to a load terminal LD of the read bit address counter 36R. The read word address counter 37R is of 210-counter progress, and its carry is applied to a clock input terminal CP of a buffer 43 and one input terminal of an AND gate 44. The buffer 43 receives the output of 5 bits in parallel from a full adder 45 when a carry occurs from the read word address counter 37R. The parallel 5-bits output 43 is fed to a preset terminal PS of read bit address counter 36R, which is preset when the aforesaid carry occurs. One input of the full adder 45 is supplied with a BCD code corresponding to 5, and the other input is supplied with the output of buffer 43, which is cleared at the end of every 35H period when the interleaving in completed. The other input terminal of the AND gate 44 is supplied with the carry of the write bit address 36R, and thereby produces an output, which is then fed to a RAM selector 40.

The interleaving operation in such a construction will be now described with reference to FIG. 5. It is first assumed that a RAM, for example RAM I, contains a PCM signal of 210 words as illustrated in FIG. 5A and the contents of RAM I are to be read out. FIG. 8 illustrates symbolically the arrangement of six words collected into three groups of two words, each, in one horizontal line interval. Each word in this arrangement is either the left or right channel signal of a stereophonic signal. The corresponding left and right signals are arranged to be recorded side by side as the two words of a group.

The content of buffer 43 is zero at first, and the write word address signal specifies $K_1$. Then, when the write bit address counter successively specifies five addresses with the application of the bit clock pulse and the first row $Z_o$ (5 bits) of word $K_1$ is completely read out, the word address counter is incremented to specify the next word $K_2$, and the first row $Z_o$ of word $K_2$ is read out. Similarly, when the first rows $Z_o$ of the remaining words up to $K_{210}$ are completely read out, a carry occurs from the read out word address counter 37R. This carry permits buffer 43 to receive the output of the full adder 45 and, as a result, the content of buffer 43 corresponds to 5, thereby presetting the read bit address counter 36R.

Therefore, the content to be read out upon specifying the word $K_1$ is at the sum address of 5 and the previous address, and hence the next row $Z_1$ of word $K_1$ is read out. Similarly, the next rows $Z_1$ of $K_2$, $K_3 \ldots K_{210}$ are read out, and then the word address 37R produces a carry, by which the content of buffer 43 is made 10(5+5=10), presetting the read bit address counter 36R. Accordingly, the third rows $Z_2$ of the respective words are read out in sequence. When the row $Z_2$ of word $K_{210}$ is read out, the content of buffer 43 becomes 15(5+10=15). Thus, the fourth rows $Z_3$ of the respective words are successively read out. Likewise, the content of buffer 43 becomes 20(5+15=20), thereby permitting the fifth rows $Z_4$ of the respective words to be read out in sequence, and the content of buffer 43 becomes 25(5+20=25), which permits the sixth rows $Z_5$ of the words to be sequentially read out. Each time the sixth row $Z_5$ of each word is read out, the read bit address counter 36R produces a carry, so that the output of the AND gate 44 is at a high level at the time point when the row $Z_5$ of word $K_{210}$ is read out. This high-level output is fed to the RAM selector 40, and hence next read operation is performed on the RAM II, and at the same time buffer 43 is cleared. Thus, by controlling the address signal upon reading as described above, it is possible to carry out the interleaving as illustrated in FIG. 4.

Figure 9:
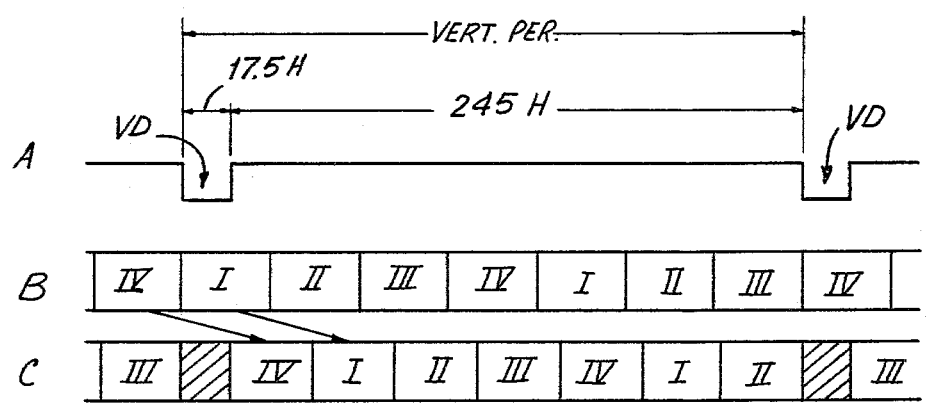
FIG. 9 shows symbolically the time-compression of signals in the circuit in FIG. 6.

FIG. 9 illustrates the operation of the RAMs. The write operation of the RAMs is performed in the order of I, II, ... IV, while the read operation thereof is stopped during the data-lacking period of 17.5 H that consists of the vertical blanking period, which includes the vertical synchronizing signal VD. When RAM I undergoes a write operation, RAM IV is subject to a read operation. To perform the de-interleaving and extend the time base, it is sufficient that the write and read operations as illustrated in FIG. 9 may be reversed. Because of the fact that the circuit can operate in reverse fashion, the de-interleave circuit 12 of the reproducing system can be formed fundamentally in the same manner as that of the interleave circuit 7.

Now, the ORC decoding will be described as carried out in the circuit 14 in FIG. 1. From the above description of encoding, the equations $$Z_0 Z_1 + Z_2 + Z_3 + Z_4 + Z_5 = 0 \tag{7}$$

$$Z'_0 + TZ'_1 + T^2 Z'_2 + T^3 Z'_3 + T^4 Z'_4 = 0 \tag{8}$$

are satisfied.

The error pattern will now be assumed as follows:

$$\begin{array}{cccccc} B_4 & B_3 & B_2 & B_1 & B_0 & \\ e_{04} & e_{03} & e_{02} & e_{01} & e_{00} & Z_0 \\ e_{04} & e_{03} & e_{02} & e_{01} & e_{10} & Z_1 \\ e_{04} & e_{03} & e_{02} & e_{01} & e_{20} & Z_2 \\ e_{04} & e_{03} & e_{02} & e_{01} & e_{30} & Z_3 \\ e_{04} & e_{03} & e_{02} & e_{01} & e_{40} & Z_4 \\ e_{54} & e_{03} & e_{02} & e_{01} & e_{50} & Z_5 \end{array} \tag{9}$$

Accordingly, an error $e_i$ ($i=0, 1, 2, 3, 4, 5$) occurring in the i-th row is expressed by $$e_i = (e_{i0}, e_{i1}, 3_{i2}, e_{i3}, 3_{i4}) \tag{10}$$

where i is 0, 1, 2, 3, 4 and 5, and a given row including this error is shown by the expression:

$$\hat{Z}_i = Z_i + e_i \tag{11}$$

Symptoms that appear when a succession of signals including the above error is received are called a syndrome, and syndromes $S_1$ and $S_2$ are defined as follows.

$$S_1 = \hat{Z}_0' + \hat{Z}_1' + \hat{Z}_2' + \hat{Z}_3' + \hat{Z}_4' + \hat{Z}_5' \tag{12}$$

$$= (S_{10}, S_{11}, S_{12}, S_{13}, S_{14})'$$

$$\left. \begin{array}{l} S_2 = \hat{Z}_0' + T\hat{Z}_1' + T^2\hat{Z}_2' + T^3\hat{Z}_3' + T^4\hat{Z}_4' \\ = \hat{B}_0 + T\hat{B}_1 + T^2\hat{B}_2 + T^3\hat{B}_3 + T^4\hat{B}_4 \\ = (S_{20}, S_{21}, S_{22}, S_{24})' \end{array} \right\} \tag{13}$$

If no error occurs, both syndromes $S_1$ and $S_2$ are zero. Thus, when error occurs, the syndromes can be rewritten as follows:

$$S_1 = \sum_{i=0}^{5} Z_i' + \sum_{i=0}^{5} e_i' = \sum_{i=0}^{5} e_i' \tag{14}$$

$$S_2 = \sum_{i=0}^{4} T^i e_i' \tag{15}$$

The syndrome $S_1$ can be determined by summing all the bits of each column of the received (reproduced) code. That is, $$\left. \begin{array}{l} S_{10} = A + B + C + D + E + a \\ S_{11} = r_4 + r_8 + r_{12} + r_{16} + r_{20} + b \\ S_{12} = r_3 + r_7 + r_{11} + r_{15} + r_{19} + c \\ S_{13} = r_2 + r_6 + r_{10} + r_{14} + r_{18} + d \\ S_{14} = r_1 + r_5 + r_9 + r_{13} + r_{17} + e \end{array} \right\} \tag{16}$$

Figure 10:
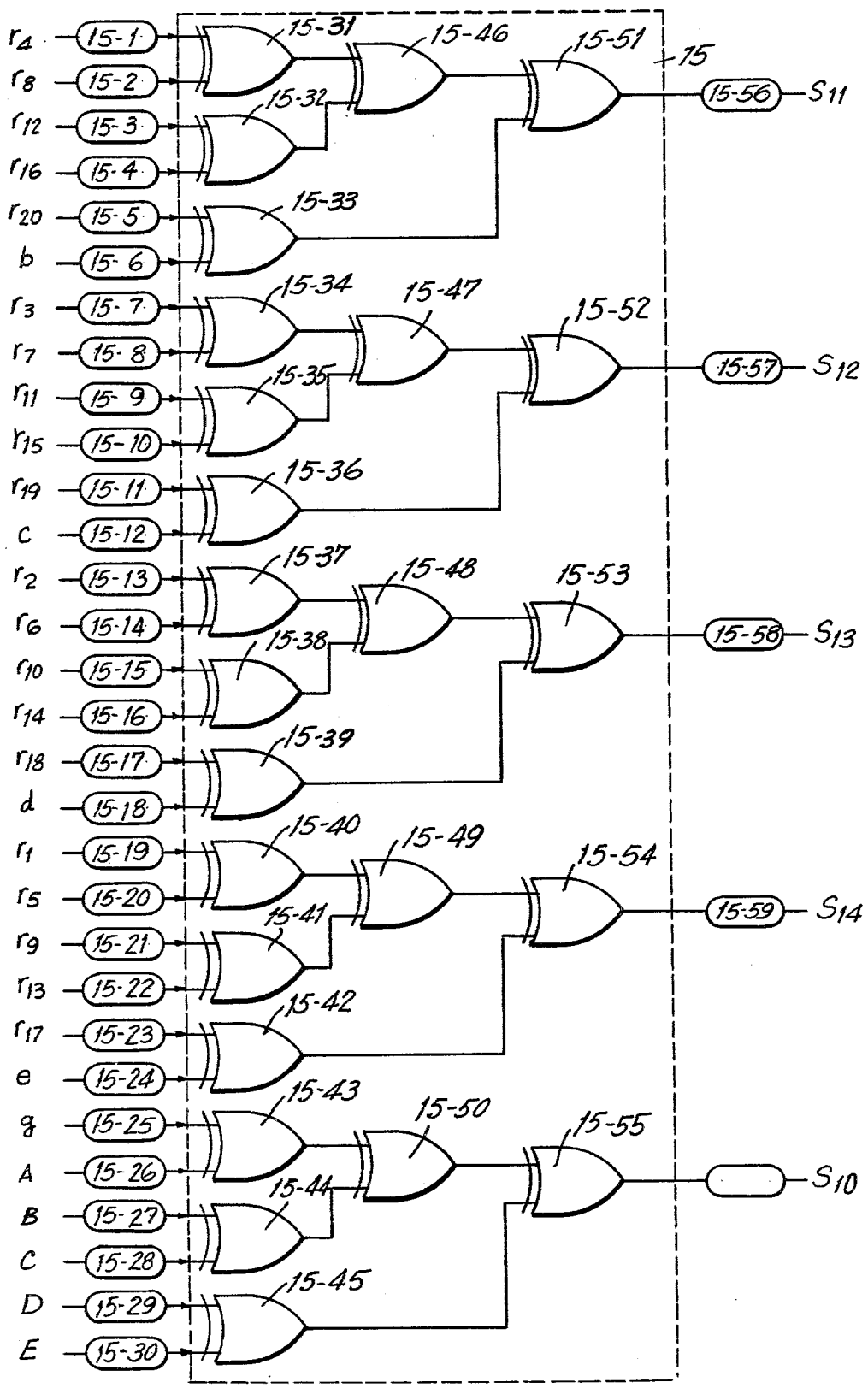
FIG. 10 is a schematic diagram of a first syndrome signal generator for use in the ORC decoder in FIG. 1.

The circuit in FIG. 10 corresponds to the block 15 in FIG. 1 and is capable of accomplishing the additions required by equations (16). The circuit in FIG. 10 has thirty input terminals 15-1 through 15-30 to which sixteen reproduced information bits $r_1$ through $r_{16}$, five ORC code bits A through E, four CRC code bits $r_{17}$ through $r_{20}$, and five vertical parity check bits a through e are applied in the order in which they are labeled on the drawing. The input terminals are connected in pairs to fifteen exclusive-OR input gates 15-31 through 15-45, respectively.

The complete circuit 15 is made up of five identical sub-circuits, and the outputs of two of the three input gates of each sub-circuit are connected to the input terminals of one of five exclusive-OR gates 15-46 through 15-20, respectively. The output terminal of each of the latter gates and the output terminal of the remaining input gate in the same sub-circuit are connected to the input terminals of an output exclusive-OR gate of that sub-circuit. These output gates 15-51 through 15-55 have output terminals 15-56 through 15-60, respectively, from which the components $S_{10}$ through $S_{14}$ of the syndrome $S_1$ are made available.

The uppermost sub-circuit, which is illustrative of all, includes the input terminals 15-1 through 15-6 to which the coefficients $r_4$, $r_8$, $r_{12}$, $r_{16}$, $r_{20}$, and b of vector $B_j$ are applied. If there is no error due to a dropout or burst, an even number of these coefficients (or none of them) will have the value "1" and the output signal $S_{11}$ will have the value "0". For a completely error-free reproduced block, all of the signals $S_{10}$ through $S_{14}$ will have the value "0".

The syndrome $S_2$ can be obtained by the following expression similar to the way in which the column vector $B_0$ was obtained at the time of encoding:

$$\left.\begin{array}{l}S_{20} = A+r_5+r_{10}+r_{15}+r_{17}+r_{20}\\ S_{21} = B+r_4+r_9+r_{14}+r_{19}\\ S_{22} = C+r_3+r_5+r_8+r_{10}+r_{13}+r_{15}+r_{17}+r_{18}+r_{20}\\ S_{23} = D+r_2+r_7+r_9+r_{12}+r_{14}+r_{17}+r_{19}\\ S_{24} = E+r_1+r_6+r_{11}+r_{13}+r_{16}+r_{18}\end{array}\right\} \quad (17)$$

Although the syndrome $S_2$ can also be formed by a feedback shift register, the simultaneous availability of all components of the syndrome in parallel makes it possible for the syndrome to be determined as given above. In the case of correcting a burst error that exists within one row, if a burst error occurs in the i-th row, the following relations are satisfied:

$$S_1 = e_i' \quad (18)$$

$$S_2 = \begin{cases} T^i e_i' & (0 \leq i \leq 4) \\ 0 & (i = 5) \end{cases} \quad (19)$$

where $S_2=0$ means that the sixth row $Z_5$ has a wrong parity bit, so that the received succession of signals itself is treated as the output data. Therefore, after the expression, $$S_3 = T^{-i}S_2 \quad (20)$$

is established and i (the row in which there is an error) is determined to satisfy the relations, $S_1 = S_3$, the operation of $$Z_i = \hat{Z}_i + S_1 \quad (21)$$

is performed, thus correcting the error $e_i$.

Figure 11:
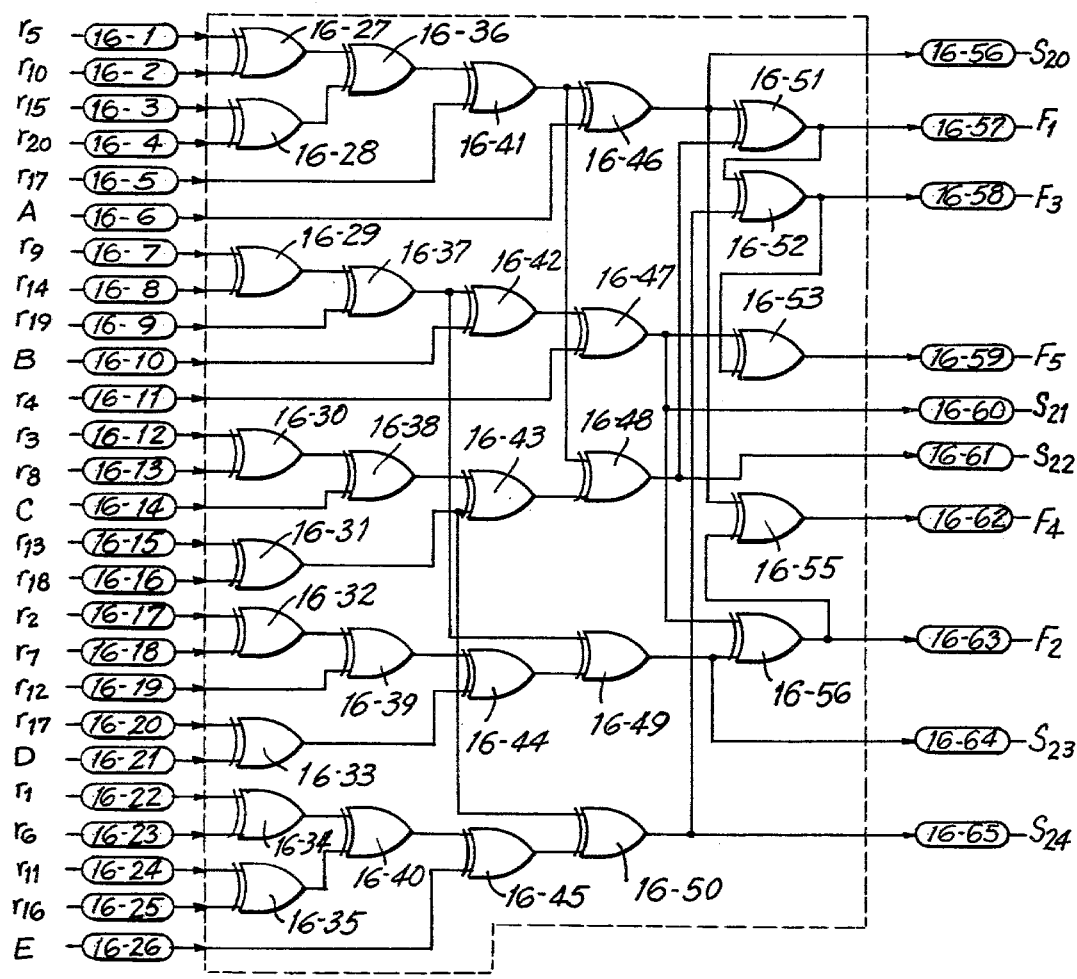
FIG. 11 is a schematic diagram of a second syndrome signal generator for use in the ORC decoder in FIG. 1.

FIG. 11 is a detailed drawing of circuit 16 in FIG. 1 for generating both the syndrome $S_2$ and the expression $S_3$ directly from the 30-bit parallel signal at the output of the series-to-parallel converter 13 in FIG. 1. Because all of the bits are applied simultaneously, the relations required for determining the syndrome $S_2$ and the expression $S_3$ are available at once and do not require a shift register.

Circuit 16 in FIG. 11 has twenty-six input terminals 16-1 through 16-26. All of the reproduced information bits $r_1$ through $r_{16}$, CRC bits $r_{17}$ through $r_{20}$, and ORC bits A through E are applied to the input terminals as labeled. The parity checking bits a through e are not applied because they do not enter into the computation of $S_2$ or $S_3$, so that there are actually only 25 of the possible 30 bits of the output signal of the series-to-parallel converter 13 applied to circuit 16. However, the bit 17 is applied to two terminals 16-5 and 16-20 so that an even number of bits is applied.

All of the components shown within the circuit 16 are exclusive-OR gates 16-27 through 16-55 arranged in five tiers. The gates are grouped together to provide modulo 2 addition according to equations (17). Gates 16-27 adds bits $r_5$ and $r_{10}$, gate 16-28 adds bits $r_{15}$ and $r_{20}$. Gate 16-36 adds the modulo 2 sum of the outputs of gates 16-27 and 16-28 and gate 16-41 adds the output of the later to the bit $r_{17}$. Finally, gate 16-46 adds the modulo 2 sum output of gate 16-41 to bit A to complete the modulo 2 sum of all of the coefficients necessary to determine the component $S_{20}$ of the syndrome $S_2$. This component is available at an output terminal 16-56, one of ten output terminals 16-56 through 16-65.

In a similar manner, gates 16-29, 16-37, 16-42, and 16-47 form the modulo 2 sum necessary to produce the syndrome component $S_{21}$ at the output terminal 16-60; and the component $S_{22}$ at the output terminal 16-61 is formed by modulo 2 addition in the gates 16-27, 16-28, 16-36, 16-41, 16-30, 16-31, 16-38, 16-43, and 16-48. The component $S_{23}$ is formed by modulo 2 addition in the gates 16-29, 16-37, 16-32, 16-33, 16-39, 16-44, and 16-49; and the component $S_{24}$ is formed by modulo 2 addition in the gates 16-31, 16-34, 16-35, 16-40, 16-45, and 16-50.

Circuit 16 also forms the matrix components $F_1$ through $F_5$ for computation of matrix $T^{-i}$ in equation (20). Component $F_1$ is formed by modulo 2 addition of components $S_{20}$ and $S_{22}$ in the gate 16-51; component $F_2$ is formed by modulo 2 addition of components $S_{21}$ and $S_{23}$ in the gate 16-56; component $F_3$ is formed by modulo 2 addition of components $S_{20}$, $S_{22}$, and $S_{24}$ in gates 16-51 and 16-52; component $F_4$ is formed by modulo 2 addition of components $S_{20}$, $S_{21}$, and $S_{23}$ in gates 16-55 and 16-56; and component $F_5$ is formed by modulo 2 addition of components $S_{20}$, $S_{21}$, $S_{22}$, and $S_{24}$ in gates 16-51, 16-52, and 16-53.

The establishment of $S_3$ can be made in parallel by predetermining $T^{-1}$, $T^{-2}$, $T^{-3}$, $T^{-4}$ and $T^{-5}$ and performing the addition of each expression as given below:

$$\left.\begin{array}{l}T^{-1}S_2 = \begin{pmatrix} S_{21} \\ S_{20}+S_{22} \\ S_{23} \\ S_{24} \\ S_{20} \end{pmatrix} \quad T^{-2}S_2 = \begin{pmatrix} S_{20}+S_{22} \\ S_{21}+S_{23} \\ S_{24} \\ S_{20} \\ S_{21} \end{pmatrix} \\ \\ T^{-3}S_2 = \begin{pmatrix} S_{21}+S_{23} \\ S_{20}+S_{22}+S_{24} \\ S_{20} \\ S_{21} \\ S_{20}+S_{22} \end{pmatrix} \quad T^{-4}S_2 = \begin{pmatrix} S_{20}+S_{22} \\ S_{20}+S_{21}+S_{43} \\ S_{21} \\ S_{20}+S_{22} \\ S_{21}+S_{33} \end{pmatrix} \\ \\ T^{-5}S_2 = \begin{pmatrix} S_{20}+S_{21}+S_{23} \\ S_{20}+S_{21}+S_{22}+S_{24} \\ S_{21}+S_{22} \\ S_{20}+S_{22}+S_{24} \end{pmatrix}\end{array}\right\} \quad (22)$$

Figure 12:
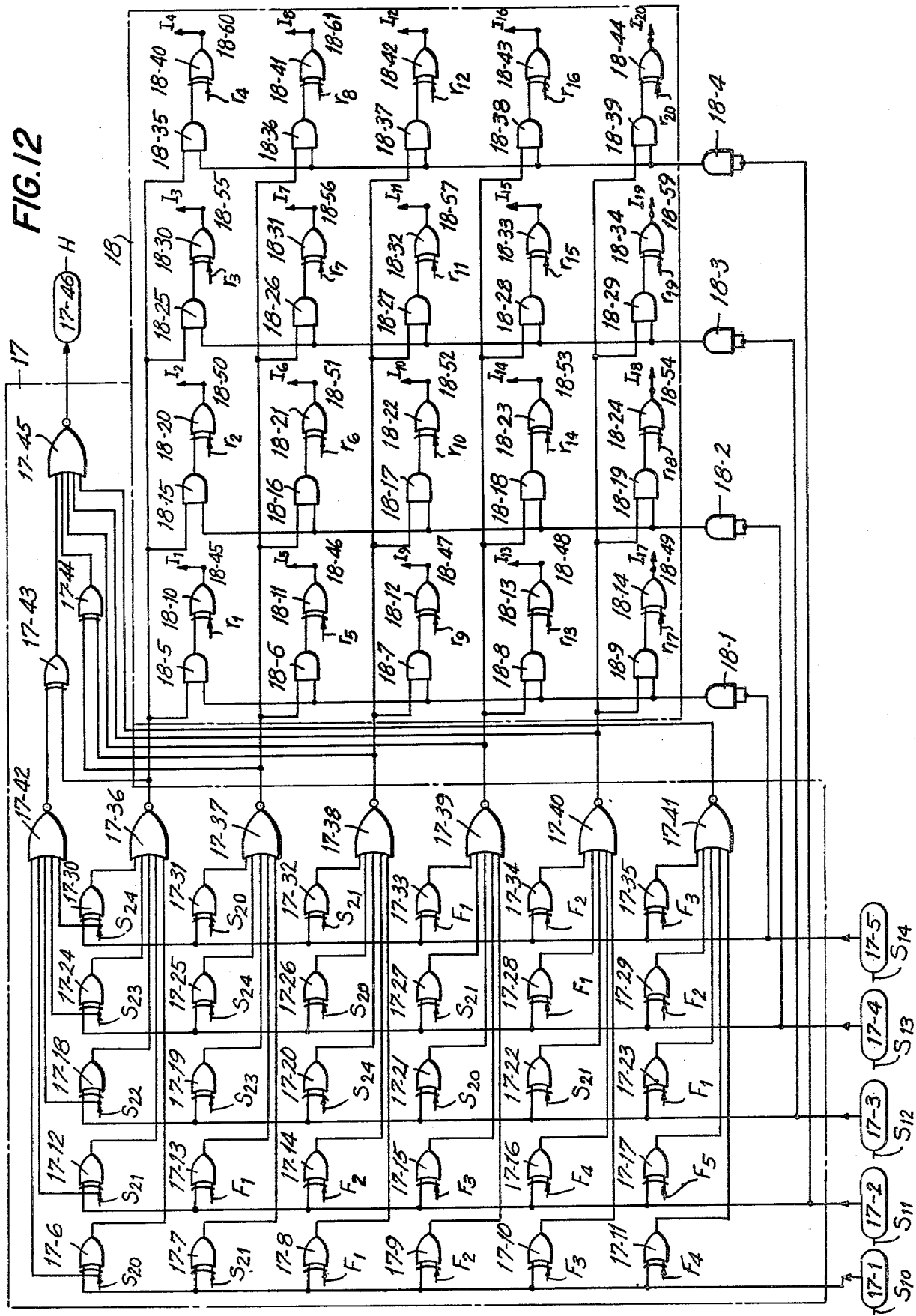
FIG. 12 is a schematic diagram of a syndrome signal comparison and error-correction circuit for use in the ORC decoder in FIG. 1.

The circuit 17 in FIG. 1, in which the syndrome $S_1$ is compared with the expression $S_3$, and the error-correcting circuit 18 are shown in detail in FIG. 12. The comparison circuit 17 has five input terminals 17-1 through 17-5. Each of the inputs is connected to a set of six exclusive-OR gates in an array of thirty such gates 17-6 through 17-35. For example, the input terminal 17-1 is connected to one input terminal of each of the gates 17-6 through 17-11. The outputs of the gates 17-6 through 17-35 are connected in interesecting sets to a set of NOR gates 17-36 through 17-41. For example the exclusive-OR gates 17-6, 17-12, 17-18, 17-24, and 17-30 comprise a set that intersects each of the sets connected to the input terminals 17-1 through 17-5, and all of the gates of this intersecting set are connected to input terminals of the NOR gate 17-36.

The components $S_{20}$ through $S_{24}$ of syndrome $S_2$ and the components $F_1$ through $F_4$ of the matrix $T^{-i}$ in equation (20) are connected to the gates 17-6 through 17-35 as indicated in FIG. 12, and if all of the components $S_{20}$ through $S_{24}$ and $F_1$ through $F_4$ are zero, which is the condition for no error, the outputs of all of the NOR gates 17-36 through 17-41 will be "1". Another NOR gate 17-42 to which only the components of the syndrome $S_2$ are connected will also have a "1" output. Two OR gates 17-43 and 17-44 combine the outputs of four NOR gates 17-36 through 17-38 and 17-42 into two input terminals of the NOR gate 17-45.

The circuit 18 as shown in FIG. 12 includes four noninverting input circuits 18-1 through 18-4 connected respectively, to the input terminals 17-2 through 17-5. The outputs of the circuits 18-1 through 18-4 are connected, respectively, to sets of five AND gates 18-5 through 18-9, 18-15 through 18-19, 18-25 through 18-29, and 18-35 through 18-39. The output of the NOR gate 17-36 is connected to an intersecting set of the AND gates 18-5, 18-15, 18-25, and 18-35, and the outputs of NOR gates 17-37 through 17-40 are connected to similar intersecting sets of the AND gates.

The outputs of the AND gates 18-5 through 18-9 are connected, respectively, to one input terminal of a set of exclusive-OR gates 18-10 through 18-24, respectively, and in the same manner, the AND gates 18-15 through 18-19 are connected to exclusive-OR gates 18-20 through 18-24, AND gates 18-25 through 18-29 are connected to exclusive-OR gates 18-30 through 18-34, and AND gates 18-35 through 18-39 are connected to exclusive-OR gates 18-40 through 18-44. The output terminals of the exclusive-OR gates in ascending numerical order are, respectively, 18-45 through 18-64.

The comparison circuit 17 generates, simultaneously, every variation of $T^{-i}S_2$, which means that it generates every possible value of $S_3$ and compares each of these values with syndrome $S_1$. If there are no errors in the reproduced signal, the syndrome $S_1$ will be "0", which means that its components $S_{10}$ through $S_{14}$ will be "0". The components $S_{20}$ through $S_{24}$ of the syndrome $S_2$ will also be "0", which means that the components $F_1$ through $F_5$ will also be "0". Consequently all of the inputs to the NOR gates 17-36 through 17-42 will be "0", and the outputs of these NOR gates will be "1". Therefore, the output value H of the NOR gate 17-45 will be "0".

The input terminals 17-2 through 17-5 of the comparison circuit 17 are shared by the error-correction circuit, and when the signal is error-free, the inputs to the circuits 18-1 through 18-4 will be "0". This causes all of the AND gates in the circuit 18 to be disabled. The output of each AND gate is combined with a specific one of the bits $r_1$ through $r_{20}$ of the reproduced signal applied to the other input terminal of the exclusive-OR gates 18-10 through 18-14 for the AND gates 18-5 through 18-9.

Because, under error-free conditions the output of each of the AND gates is "0", the output of each of the exclusive-OR gates at the respective output terminal 18-45 through 18-64 corresponds to the value of the bit $r_i$ applied to that exclusive-OR gate. Mathematically this corresponds to adding "0" to each bit $r_i$, which, of course, does not change the value of the latter at all.

However, if there is an error in even a single reproduced bit, the condition of circuits 17 and 18 changes considerably. For example, in the case of the arbitrarily chosen number 10110100100011010100 referred to previously in analyzing the CRC encoder 5, the first sixteen digits are information bits $r_1$ through $r_{16}$ and the last four are CRC bits $r_{17}$ through $r_{20}$. If, between the encoding circuit 5 and the syndrome $S_1$ generator 15, the value of bit $r_{16}$ is changed from "1" to "0", the component $S_{11}$ of the syndrome $S_1$ will change from "0" to "1" at the output signal 15-56 in FIG. 10. The error in bit $r_{16}$ also causes the component $S_{24}$ of the syndrome $S_2$ as generated at the output terminal 16-65 in circuit 16 in FIG. 11 to change from "0" to "1", which changes the value of component $F_3$ at the output terminal 16-58 from "0" to "1". This, in turn, causes the component $F_5$ at the output terminal 16-59 to change from "0" to "1".

When these modified values are applied to the comparison circuit 17 in FIG. 12, the component $S_{11}$ applied by way of the input terminal 17-2 causes the upper input terminal of each of the exclusive-OR gates 17-12 through 17-17 to have a "1" signal applied to it. The change of value of the component $S_{24}$, which is applied either by itself or as part of the components $F_3$ and $F_5$, to the lower input terminal of the diagonal line of exclusive-OR gates 17-10, 17-15, 17-20, 17-25, and 17-30 and to the exclusive-OR gates 17-17 and 17-35 in the bottom row, causes all of these lower input terminals to take on the value "1". As a result, at least one input to each of the NOR gates 17-36 through 17-42, except the NOR gate 17-39, has a "1" value instead of a "0" value. The output value of the NOR gate 17-45 remains at "0" due to the fact that at least one of its input terminals has a "1" value signal on it. This one input terminal is the one connected to the output of the NOR gate 17-39. The output of that NOR gate remains at "1" because the "1" value of the components $S_{11}$ and $F_5$ applied to the two input terminals of the exclusive-OR gate 17-15 cause both of these input terminals to change from "0" to "1", and the modulo 2 addition in that exclusive-OR gate causes its output terminal to remain at "0".

Because of the "0" value output of each of the NOR gates 17-36 through 17-38 and 17-40, all of the AND gates in the error-correction circuit 18 connected thereto are disabled. Only one row of AND gates 18-8, 18-18, 18-28, and 18-38 are enabled by the "1" value output of the NOR gate 17-39. But three of these four enabled AND gates are disabled by "0" signals from the circuits 18-1 through 18-3. These are AND gates 18-8, 18-18, and 18-28. Only AND gate 18-38 has a "1" value applied to both of its input terminals and, therefore, this is the only AND gate that supplies a "1" value signal to the exclusive-OR gate 18-43 to which it is connected.

It is this same exclusive-OR gate 18-43 to which the bit $r_{16}$ is connected. That bit has been assumed to have the erroneous value "0" instead of "1". However, the exclusive-OR gate adds the value "1" from the AND gate 18-38 to produce a corrected "1" value at its output terminal 18-63. If the bit $r_{16}$ had erroneously been a "1", it would have been corrected to "0" by the modulo 2 addition with the "1" value of the output from the AND gate 18-38. Thus, all of the output terminals 18-45 through 18-64 have correct values of output bit signals $r_1$ through $r_{20}$.

Figure 13:
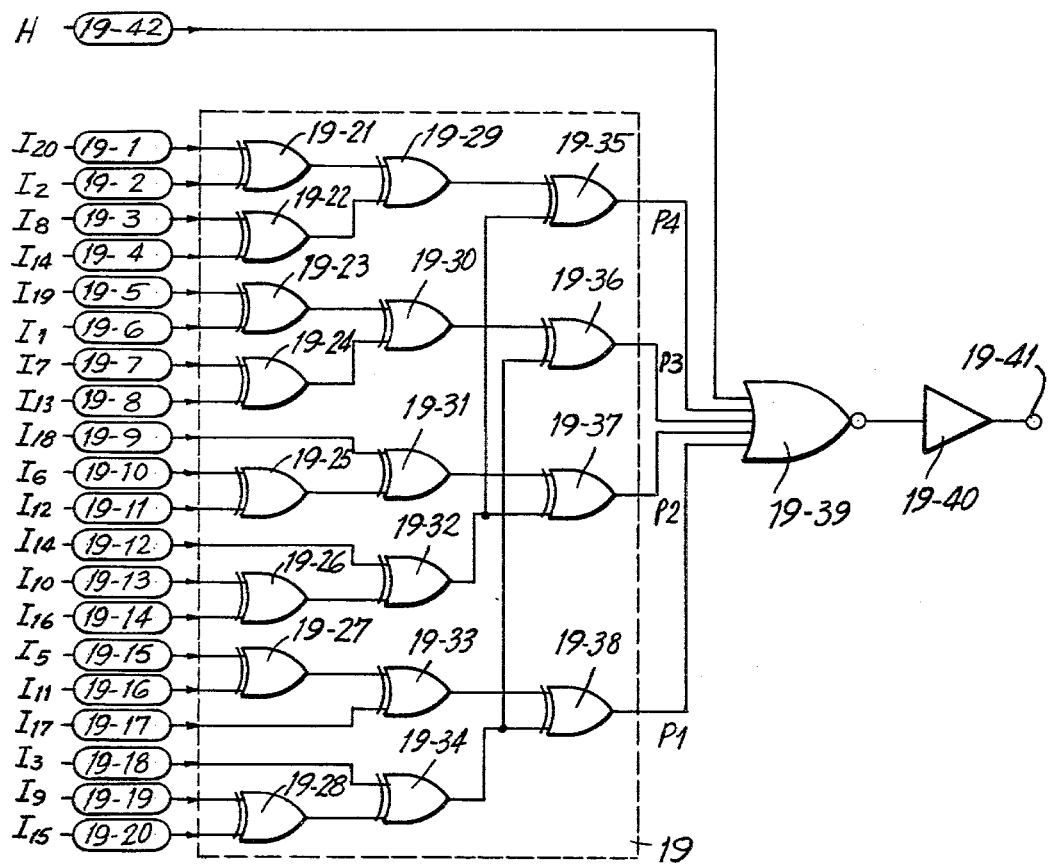
FIG. 13 is a schematic diagram of a CRC decoder for use in the system in FIG. 1.

The corrected bits $I_1$ through $I_{20}$ are supplied from the output terminals 18-45 through 18-64 and are applied to input terminals 19-1 through 19-20 of the CRC decoder 19 in FIG. 13 in the order identified in that figure. The bit signals $I_1$ through $I_{20}$ are the same as the bits $r_1$ through $r_{20}$, respectively, but have been identified by the letter "I" to indicate that they have passed through the error-correction circuit 18.

Like several of the other circuits, the CRC decoder 19 consists of a set of exclusive-OR gates 19-21 through 19-38 to add the inputs $I_1$ through $I_{20}$ selectively, always on a modulo 2 basis. The gates 19-21 and 19-22 receive and add the input bits $I_{20}$, $I_2$, $I_8$ and $I_{14}$, and the gate 19-29 adds the outputs of the gates 19-21 and 19-22 together. The gate 19-26 adds the bits $I_{10}$ and (now-corrected) $I_{16}$ and the gate 19-32 adds to the sum thereof the bit $I_{14}$. The outputs of the gates 19-29 and 19-32 are added together in the gate 19-35 to form the output signal $P_4$.

The gate 19-25 forms a moludo 2 sum of the bits $I_6$ and $I_{12}$ and the gate 19-31 adds the bit $I_{18}$ to this sum. The outputs of the gates 19-31 and 19-32 are combined in the gate 19-37 to form the output signal $P_2$.

The gates 19-23, 19-24, and 19-30 form the sum of the bits $I_{19}$, $I_1$, $I_7$, and $I_{13}$ and this sum is applied to one input terminal of the gate 19-36. The gates 19-28 and 19-34 form the sum of the bits $I_3$, $I_9$, and $I_{15}$ and supply this sum to the other input terminal of the gate 19-36. The output of the latter gate is the output signal $P_3$.

The gates 19-27 and 19-33 add the bits $I_5$, $I_{11}$, and $I_{17}$, and the resulting sum is added to the output of the gate 19-34 in the gate 19-38 to form the output signal $P_1$.

The output signals $P_1$ through $P_4$ are combined in an OR gate, which is made up of a NOR gate 19-39 and an inverter 19-40. The output terminal of this OR gate is terminal 19-41

The signal H from the coincidence circuit 17 is also supplied through an input terminal 19-42 to the NOR gate 19-39. Signal H has the value "0" if there are no uncorrectable errors in the coincidence circuit but the value "1" if the syndrome $S_1$ does not equal the expression $S_3$, which indicates that there are errors that the ORC circuitry cannot correct.

If only one row of the original array of bits in the order in which they appear in FIG. 26 has errors, they can be corrected in the ORC decoder 18, but if two or more rows have bits with erroneous values, the combined circuits 17 and 18 cannot correct them. In that case, the CRC decoder 19 detects the error. Such a large number of errors is quite rare, but this system is of professional quality, and it is important to correct all errors.

Mathematically, the CRC decoder divides the polynomial having the coefficients of information bits $I_1$ to $I_{16}$ and CRC code ($I_{17}$ to $I_{20}$) by a generating polynomial. When the remainder of four bits is represented by $P_1$ to $P_4$, respectively, each of the bits can be derived from the following expressions as in the case of encoding:

$$P_1 = I_3 + I_5 + I_9 + I_{11} + I_{15} + I_{17}$$

$$P_2 = I_4 + I_6 + I_{10} + I_{12} + I_{16} + I_{18}$$

$$P_3 = I_1 + I_3 + I_7 + I_9 + I_{13} + I_{15} + I_{19}$$

$$P_4 = I_2 + I_4 + I_8 + I_{10} + I_{14} + I_{16} + I_{20} \qquad (23)$$

If the outputs of the four bits $P_1$ to $P_4$ from the CRC decoder 19 are all "0", it indicates that no error occurs, but if even one of the four bits becomes "1", the occurrence of error are recognized and can be detected.

FIG. 14 shows an example of the interpolation circuit 21, which has an input terminal 31 at which a clock pulse CK is applied and a terminal 32 to which the output of the OR gate 20 is supplied. The circuit also includes latch circuits 33 and 34, which are connected so that a parallel 16-bit output signal $U_1$ from the latch circuit 33 can be supplied to the latch circuit 34. A D-type flip-flop circuit 33a associated with the latch circuit 33 has its D-input terminal connected to the terminal 32 and its output terminal connected to the D-input terminal of another D-type flip-flop circuit 34a, which is associated with the latch 34. The outputs $Q_1$ and $Q_2$ of the flip-flop circuits 33a and 34a, respectively, occur slightly delayed from the time when the clock pulse CK occurs.

A data selector 35 composed of an input selecting gate and a latch circuit is also part of the interpolation circuit 21. The data selector 35 selects either a parallel 16-bit output signal $U_2$ of the latch circuit 34 or a parallel 16-bit output signal $U_4$ supplied from a mean-value forming circuit 36 that consists of full adders and performs in a digital manner. The selection is made in accordance with an output $N_1$ of a NAND gate 37 in such a way that the selector 35 chooses the output $U_2$ if $N_1 = $ "1" or the output $U_4$ if $N_1 = $ "0".

One of the two input signals to the mean-value forming circuit 36 is the parallel 16-bit output signal $U_1$ of the latch circuit 33 and the other is an output signal $U_3$ of the data selector 35. The circuit 36 produces the output signal $U_4$ as a mean value of its two input signals. The NAND gate 37 is supplied with the output $Q_1$ of the D-type flip-flop circuit 34a. The output $N_2$ of a NAND gate 39 to which the outputs $Q_1$ and $Q_2$ are applied is supplied to the J-input terminal of a J-K flip-flop circuit 40, and through a NOT circuit, or inverter, 41 to the K-input terminal of the J-K flip-flop circuit 40. An output $Q_3$ of the J-K flip-flop circuit 40 is fed to a NAND gate 42, the output $N_3$ of which is applied to the data selector 35 for the latter to operate at each clock pulse.

The operation of the interpolation circuit 21 constructed as described will now be described in connection with FIGS. 15 and 16. The 16-bit information as a PCM signal m is supplied from the error-correcting circuit 18 and includes a sequence of signals $m_1$, $m_2$, $m_3$, .... Also, it is first assumed that each of the signals $m_1$ to $m_4$ does not includes an error, that signal $m_3$ is latched onto the latch circuit 33, that signal $m_2$ is latched onto the latch circuit 34, and that signal $m_1$ is latched onto the data selector 35 with signal $m_1$ appearing as the output signal $U_3$ of the data selector 35 before the first pulse $CK_1$ illustrated in FIG. 16A occurs. Then, when the first clock pulse $CK_1$ does occur, signal $m_4$ is latched onto latch circuit 33, and signal $m_3$ is transferred to the latch circuit 34. Since the output of the OR gate 20 supplied to the terminal 32 together with the signal $m_4$ is "0", the output $Q_1$ (shown in FIG. 16B) of the flip-flop circuit 33a is "0". In addition, since it has been assumed that the signal $m_3$ does not include an error, the output $Q_2$ (shown in FIG. 16C) of the flip-flop circuit 34a is also "0". Therefore, the output of the NAND gate 37 as shown by FIG. 16D, has a value of "1", as does the output $N_2$ of the NAND gate 39. Hence, the output $Q_3$ of J-K flip-flop circuit 40 is "1", as shown by FIG. 16E. As a result, the data selector 35 is supplied with a clock pulse $N_3$ (shown by FIG. 16J) corresponding to the clock pulse $CK_1$ so that the signal $m_2$ is latched onto the data selector 35 to appear as the output signal $U_3$.

If the next information bit signal $m_5$ includes an error, signal $m_5$ is latched onto the latch circuit 33 by the application of the clock $CK_2$ thereto and signal $m_4$ is latched onto the latch circuit 34. Then, the output $Q_1$ becomes "1" at a time somewhat delayed from the time when the clock pulse $CK_2$ occurs. Since the output $Q_2$ is "0", the outputs $N_1$ and $N_2$ of NAND circuits 37 and 39 are both "1", and hence the output $Q_3$ is "1". The clock pulse $N_3$ corresponding to clock pulse $CK_2$ is applied to the data selector 35, so that the signal $m_3$ is latched onto the data selector 35 to appear as the output $U_3$.

If the next information bit signal $m_6$ is correct, the clock pulse $CK_3$ is applied to the latch circuit 33, onto which the signal $m_6$ is thus latched as signal $m_5$ is latched onto latch circuit 34. Since the outputs $Q_1$ and $Q_2$ equal "1" and "0", respectively, at the time of occurrence of the clock pulse $CK_3$, the outputs $N_1$ and $N_2$ are both "1" and hence the output $Q_3$ becomes "1". Then, the clock pulse $N_3$ corresponding to clock pulse $CK_3$ is applied to data selector 35, onto which signal $m_4$ is latched to appear as output signal $U_3$.

If the next information bit signal $m_7$ is wrong, clock pulse $CK_4$ is fed to the latch circuit 33, onto which the signal $m_7$ is thus latched, and the signal $m_6$ is latched onto the latched circuit 34. At this time, the mean value forming circuit 36 produces a mean value of signals $m_6$ and $m_4$, namely, the value $(m_4+m_6)/2$. Since the outputs $Q_1$ and $Q_2$ are "0" and "1", respectively, at the time the clock pulse $CK_4$ occurs, the output $N_1$ becomes "0". Thus, the mean value $(m_4+m_6)/2$ is latched onto the data selector 35 instead of the signal $m_5$, which appears as the output signal $U_3$.

If the next information bit signal $m_8$ is also wrong, the signals $m_8$ and $m_7$ are latched onto the latch circuits 33 and 34, respectively, by the application of clock pulse $CK_5$, and since the outputs $Q_1$ and $Q_2$ equal "1" and "0", respectively, signal $m_6$ is latched onto the data selector 35 to appear as the output signal $U_3$.

Upon the application of the next information bit signal $m_9$ (assumed to be correct), the clock pulse $CK_6$ is supplied to the latch circuit 33, and the signal $m_9$ is thus latched thereon. At the same time signal $m_8$ is latched onto latch circuit 34. At this time, since the outputs $Q_1$ and $Q_2$ are both "1", the output $N_2$ becomes "0" to make the output $Q_3$ of J-K flip-flop circuit 40 "0", with the result that the data selector 35 is not supplied with a clock pulse corresponding to clock pulse $CK_6$, as may be seen in FIG. 16J. Therefore, the signal $m_6$ is kept as the output signal $U_3$, that is, the data selector 35 acts to hold the previous value.

When the next information bit signal $m_{10}$ (assumed to be correct) occurs, the clock pulse $CK_7$ is applied to the latch circuit 33 to latch the signal $m_6$ thereon, and the signal $m_9$ is latched onto the latch circuit 34. At the same time, since the outputs $Q_1$ and $Q_2$ equal "0" and "1", respectively, the output $N_1$ becomes "0" and hence the data selector 35 produces the output $U_3$ of $(m_6+m_8)/2$ from the mean value forming circuit 36. If the next succession of information bit $m_{11}, m_{12}, \ldots$ are correct, the application of clock pulses $CK_8, CK_9, \ldots$ causes the data selector 35 to produce the output signal $U_3$ of signals $m_9, m_{10}, m_{11}, m_{12}, \ldots$ in sequence.

As described above, the interpolation circuit 21 permits correct information bit signals to pass therethrough as its outputs, and a wrong information bit signal to be replaced by a mean value of the correct bits adjacent thereto, as its output. In addition, if a succession of incorrect bits occurs, the interpolation circuit 21 functions to hold the previous correct information bits. Of course, there is a very low probability that correction by the ORC will be impossible.

In accordance with the present invention as stated above, the error-correcting code, which, when arranged in a matrix form, makes it possible to correct a burst error in the row direction, can be converted to a series arrangement in order to be processed as a series signal, for example by being recorded on a single magnetic track. In this case, since the error-correcting code is not only arranged to be $Z_0, Z_1, Z_2, \ldots Z_5$ in series at each clock as shown in FIG. 5A, but also rearranged by the interleave circuit 7 to take the form of $Z_0 \ldots Z_0, Z_1 \ldots Z_1, \ldots$, i.e., the six groups of the corresponding rows in the plurality of clocks are continuous in series as illustrated in FIG. 5B, it is possible to reduce considerably the influence of a drop out, which is inevitable when using magnetic mediums. That is, any burst error due to a drop out or the like which does not exceed the length of 210 words, which, at six words per line interval, cover 35 line intervals, can be made to exist within one row in each block by the ORC arrangement, and thus corrected.

If the error-correcting code does not undergo the interleave process with only the series conversion made as illustrated in FIG. 5A, only the two wrong bits extending over rows $Z_0$ and $Z_1$, by way of example, results in the error of two rows. However, by means of the ORC, it is possible to correct the error of two rows as long as the numbers of the incorrect rows can be detected by other means.

In order to avoid the complexity of the construction of the system, it is desirable to arrange that any burst error exist within one row. Even if the system is constructed to be capable of correcting error in two rows, a burst error of at most two rows can be corrected. As in the above emodiment, providing the capability of completing the rearrangement within one field would be advantageous for editing recorded signals.

Further, the present invention makes use of the combination of the error detecting code (CRC code), and the ORC, and hence is characterized by a very high probability of error detection. In addition, this invention, as described in the above embodiment, is best suited for converting an audio signal to a PCM signal, such as a 16-bit PCM signal for each of the two channels of a stereo signal, and using as its transmission medium a single track as a VTR of a wide-band magnetic recording and reproducing apparatus.

What is claimed is:

1. A method of processing multi-bit, parallel digital signals, said method comprising the steps of arranging blocks of said digital signals, each block having first sets of bits and second sets of said bits intersecting said first sets of bits in row by column relationship; adding to each set of bits of said first sets an error-correcting code bit signal related to the bits of said multibit signals to modify each of said first sets into a digital word; and interleaving said digital words of a plurality of said blocks into a serial signal in word sequential relationship; with the digital words of said plurality of blocks interleaved to place corresponding digital words of different ones of said plurality of blocks in immediate succession.

2. The method of claim 1 in which said bits of each of said first sets of bits are in order of bit significance prior to the addition of said error-correcting code bit signals and said digital words are interleaved in order of bit significance of the bits in each of said words, whereby words of adjacent bit significance are arranged in immediate succession.

3. The method of claim 1 comprising the additional step of adding an error-detecting code bit signal to each set of said second sets of bits to extend said second sets prior to adding said error-correcting code bit signal to said first sets of bits, said error-correcting code bit signal including a code bit signal for said error-detecting bits.

4. A method of processing digital signals comprising digitalized information bit signals, said method comprising the steps of:

adding error detecting code bit signals to said information bit signals to form a composite digital signal;

dividing said composite digital signal into first sets and second sets intersecting said first sets in row by column relationship;

generating error correcting code bit signals from said composite digital signals, said error correcting code being capable of correcting a burst error in any one of said first sets;

adding said error correcting code bit signals to said divided composite digital signals of said first sets to form a digital word signal corresponding to each set of said first sets;

arranging said digital word signals serially so that each digital word signal formed from each of said composite digital signals is time-adjacent to a digital word signal from a different composite digital signal; and adding synchronizing signals of video line and field frequencies to said arranged digital signals to produce a composite signal having a television video format.

5. The method according to claim 4 comprising the step of recording said television video format signal on magnetic tape; and controlling the tape by said synchronizing signals.

6. A method of processing digital signals containing parallel information bit signals, said method comprising the steps of:

adding error detecting code bit signals to said parallel information bit signals to form a composite digital signal;

dividing said composite digital signal into first sets and second sets intersecting said first sets in row by column relationship;

generating error correcting code bit signals from said composite digital signals, said error correcting code being capable of correcting a burst error in any one of said first sets;

adding said error correcting code bit signals to said divided composite digital signals of said rows to form a parallel digital word signal corresponding to each set of said first sets;

converting said parallel digital word signals to serial signals;

arranging the serial signals so that a digital word signal of each of said composite bit signals is time-adjacent to a corresponding digital word signal of another composite digital signal;

rearranging said serial signals so that all of the digital word signals of each of said composite bit signals are grouped together in their original time relationship; and reconverting the rearranged signals to be parallel.

7. The method of claim 6 comprising the steps of:

selectively combining said error-correcting code bit signals selectively to produce bit correction signals; and combining said bit correction signals with any erroneous, reconverted bit signals.

8. The method of claim 7 comprising generating an indicator signals to indicate the presence of erroneous bit signals that cannot be corrected.

9. The method of claim 7 comprising selectively combining said error detecting code bit signals and reconverted bit signals to detect erroneous uncorrectable reconverted bit signals not corrected by said correction signals.

10. The method of claim 9 comprising:

storing said reconverted bit signals corresponding to a complete one of said digital signals at a time; and forwarding the stored signal if the reconverted bit signals corresponding to the next one of said digital signals contains no uncorrected bit signals.

11. The method of claim 9 comprising:

storing said reconverted bit signals corresponding to a complete one of said digital signals;

forming a mean value signal with the stored and the second succeeding complete digital signal if the first succeeding complete digital signal is in error and said second succeeding complete digital signal is error-free; and replacing said first succeeding complete digital signal with said mean value signal.

12. The method of claim 9 comprising the steps of:

successively storing said reconverted bit signals corresponding to a complete one of said digital signals; and retaining the stored signal if the next two reconverted bit signals, each corresponding to a complete one of said digital signals, are in error.

13. Apparatus for processing multi-bit, parallel digital signals consisting of information words comprising:

means for selecting a plurality of said information words to form a block;

generating means for generating parallel error-correcting signals capable of being used to correct errors in said information words in said block;

means for combining said information words with said error-correcting signals to form an error-correctable block;

conversion means connected to said generating means for converting said information words and error-correcting signals in a plurality of said error-correctable blocks into serial signals; and interleaving means for interleaving said serial signals into digital words each of which contains corresponding information words and error-correcting signals from different ones of said plurality of error-correctable blocks.

14. Apparatus for processing multi-bit parallel digital signals consisting of information words in which adjacent bits have adjacent orders of significance comprising:

means for selecting a plurality of said information words to form a block;

generating means for generating parallel error-correcting signals capable of being used to correct errors in said information words;

means for combining said information words with said error-correcting signals into an error-correctable block;

conversion means connected to said generating means for converting said information words and error-correcting signals of said error-correctable block into serial signals;

interleaving means for interleaving said serial signals of a plurality of said error-correctable blocks into digital words each of which contains corresponding information words and error-correcting signals from each of said plurality of said error-correctable blocks;

second generating means for generating error-detecting signals capable of being used to detect errors in said information words and said error-correcting signals; and means connecting said second generating means to said first-named generating means to control the generation of said error-correcting signals in response to said error-detecting signals and to said information words.

15. The apparatus of claim 14 in which said first-named generating means is operative to generate a first set of error-correcting signals equal to an integral submultiple of the sum of the bits in said information words and the bits in said error-detecting signals and further operative to generate a second set of error-correcting signals equal to an integral submultiple of the first-named sum and the number of bits in said first set of error correcting signals, said information words, error-correcting signal and error-detecting signal comprising said error-correctable block.

16. The apparatus of claim 15 in which said conversion means converts said error-correctable block into integral submultiple sets, one of said integral submultiple sets containing all of said second set of error-correcting signals and each of the rest of said submultiple sets containing one bit of said first set of error-correcting signals.

17. The apparatus of claim 16 in which said signal interleaving means comprises:

memory means for receiving said submultiple sets in sequence;

first clocking means connected to said memory means for clocking said sub-multiple sets into said memory means at a fixed rate; and second clocking means connected to said memory means for clocking said sub-multiple sets out of said memory at a faster, intermittent rate to produce data-lacking periods at predetermined intervals.

18. The apparatus of claim 17 in which said memory means comprises random access memory means.

19. The apparatus of claim 17 comprising control means connected to said memory means to cause said second clocking means to clock a succession of corresponding sub-multiple sets of different ones of said composite digital words out of said memory means.

20. The apparatus of claim 17 comprising synchronizing signal adding means connected to said interleaving means for adding video horizontal and vertical synchronizing signals to the sub-multiple sets from said memory means during said data-lacking periods.

21. The apparatus of claim 20 comprising video tape recording means connected to receive said sub-multiple sets with said synchronizing signals added thereto.

22. Apparatus for processing multi-bit, parallel digital signals consisting of information words comprising:

means for selecting a plurality of said information words to form a block;

generating means for generating parallel error-correcting signals capable of being used to correct errors in said information words in said block;

means for combining said information words with said error-correcting signals to form an error-correctable block;

conversion means connected to said generating means for converting said information words and error-correcting signals in a plurality of said error-correctable block into serial signals;

interleaving means for interleaving said serial signals into digital words each of which contains corresponding information words and error-correcting signals from different ones of said plurality of error-correctable blocks;

means to sample an analog signal at a predetermined rate; and means to generate said information words as a series of pulses digitally coded according to the amplitude of the sample signal.

* * * * *